US008605544B1

(12) United States Patent
Baig et al.

(10) Patent No.: US 8,605,544 B1
(45) Date of Patent: Dec. 10, 2013

(54) HYBRID SEISMIC SENSOR NETWORK

(71) Applicant: ESG Solutions Inc., Kingston (CA)

(72) Inventors: Adam Mirza Baig, Kingston (CA);
Theodore Ivan Urbancic, Inverary (CA)

(73) Assignee: ESG Solutions Inc., Kingston, Ontario (CA)

( * ) Notice: Subject to any disclaimer, the term of this patent is extended or adjusted under 35 U.S.C. 154(b) by 0 days.

(21) Appl. No.: 13/646,075

(22) Filed: Oct. 5, 2012

(51) Int. Cl.
*G01V 1/00* (2006.01)

(52) U.S. Cl.
USPC .................................. 367/57; 367/38; 367/14

(58) Field of Classification Search
USPC .......... 181/122; 324/323, 334, 338, 344, 347; 367/14, 25, 43, 73, 182; 702/14
See application file for complete search history.

(56) References Cited

U.S. PATENT DOCUMENTS

| | | | | |
|---|---|---|---|---|
| 3,582,875 | A * | 6/1971 | Van Wambeck et al. | 367/182 |
| 4,760,563 | A * | 7/1988 | Beylkin | 367/73 |
| 6,462,549 | B1 * | 10/2002 | Curtis et al. | 324/323 |
| 6,618,325 | B1 * | 9/2003 | VanZandt et al. | 367/182 |
| 7,660,194 | B2 | 2/2010 | Uhl et al. | |
| 2009/0299637 | A1 | 12/2009 | Dasgupta | |
| 2010/0296366 | A1 * | 11/2010 | Kamata | 367/25 |

OTHER PUBLICATIONS

"Geophone" (Wikipedia, from Internet Archive, Sep. 20, 2010, downloaded Mar. 23, 2013 from http://web.archive.org/web/20100920033416/http://en.wikipedia.org/wiki/Geophone).*

"Nyquist rate" (Wikipedia, from Internet Archive, Feb. 16, 2010, downloaded Mar. 23, 2013 from http://web.archive.org/web/20100216041547/http://en.wikipedia.org/wiki/Nyquist_rate).*

Withers et al., "A Comparison of Select Trigger Algorithms for Automated Global Seismic Phase and Event Detection," Bulletin of the Seismological Society of America, vol. 88, No. 1, pp. 95-106, Feb. 1998.

Prugger et al., "Microearthquake Location: A Nonlinear Approach That Makes Use of a Simplex Stepping Procedure," Bulletin of the Seismological Society of America, vol. 78, No. 2, pp. 799-815, Apr. 1988.

Urbancic et al., "Automatic Time-Domain Calculation of Source Parameters for the Analysis of Induced Seismicity," Bulletin of the Seismological Society of America, vol. 86, No. 5, pp. 1627-1633, Oct. 1996.

Brune, "Tectonic Stress and the Spectra of Seismic Shear Waves from Earthquakes," Journal of Geophysical Research, vol. 75, No. 26, pp. 4997-5009, Sep. 10, 1970.

Walter et al., "Spectra of Seismic Radiation From a Tensile Crack," Journal of Geophysical Research, vol. 98, No. B3, pp. 4449-4459, Mar. 10, 1993.

(Continued)

*Primary Examiner* — Isam Alsomiri
*Assistant Examiner* — Daniel L Murphy
(74) *Attorney, Agent, or Firm* — RatnerPrestia

(57) ABSTRACT

A system for monitoring seismicity during fluid injection at or near a hydrocarbon reservoir comprising: a first set of seismic sensors for deployment at a site for collecting seismic data; a second set of seismic sensors for sub-surface deployment at the site at a depth lower than the first set of seismic sensors for collecting seismic data, the first set of seismic sensors having a lower frequency response than that of the second set of seismic sensors; and a data collection system in communication with the first and second set of sensors.

22 Claims, 19 Drawing Sheets

(56) References Cited

OTHER PUBLICATIONS

Trifu et al., "*Short Notes*: A Fast Evaluation of the Seismic Moment Tensor for Induced Seismicity," Bulletin of the Seismological Society of America, vol. 90, No. 6, pp. 1521-1527, Dec. 2000.

Hudson et al., "Source Type Plot for Inversion of the Moment Tensor," Journal of Geophysical Research, vol. 94, No. B1, pp. 765-774, Jan. 10, 1989.

Dufumier et al., "On the resolution of the isotropic component in moment tensor inversion," Geophys. J. Int., (1997), 595-606.

Gephart et al., "An Improved Method for Determining the Regional Stress Tensor Using Earthquake Focal Mechanism Data: Application to the San Fernando Earthquake Sequence," Journal of Geophysical Research, vol. 89, No. B11, pp. 9305-9320, Oct. 10, 1984.

Müller, "Volume Change of Seismic Sources from Moment Tensors," Bulletin of the Seismological Society of America, 91, 4, pp. 880-884, Aug. 2001.

Guest et al., "Relationship between the Hydraulic Fracture and Observed Microseismicity in the Bossier Sands, Texas," Canadian Unconventional Resources and International Petroleum Conference, Calgary, Alberta, Canada, Oct. 19-21, 2010.

Focal Mechanism—Wikipedia, the free encyclopedia, http://en.wikipedia.org/wiki/Moment_tensor_solution, Jun. 10, 2011.

Vavryčuk," Inversion for parameters of tensile earthquakes," Journal of Geophysical Research, vol. 106, No. B8, pp. 16,339-16,355, Aug. 10, 2001.

Eisner et al., "Beyond the dots in the box: microseismicity-constrained fracture models for reservoir simulation," The Leading Edge, pp. 936-942, Mar. 2010.

Williams-Stroud et al., "Stimulated Fractured Reservoir DFN Models Calibrated With Microseismic Source Mechanisms," $44^{th}$ U.S. Rock Mechanics Symposium and $5^{th}$ U.S.-Canada Rock Mechanics Symposium, Jun. 27-30, 2010, Salt Lake City, Utah (Abstract).

Urbancic et al., "Using Microseismicity to Map Cotton Valley Hydraulic Fractures,"SEG 2000 Expanded Abstracts.

Baig et al., "Microseismic moment tensors: A path to understanding frac growth," The Leading Edge, pp. 320-324, Mar. 2010.

Hanks et al., "A Moment Magnitude Scale," Journal of Geophysical Research, vol. 84, No. B5, May 10, 1979, pp. 2348-2350.

Boore et al., "Average Body-Wave Radiation Coefficients,"Bulletin of the Seismological Society of America, vol. 74, No. 4, Oct. 1984, pp. 1615-1621.

Boatwright, "A Spectral Theory for Circular Seismic Sources; Simple Estimates of Source Dimension, Dynamic Stress Drop, and Radiated Seismic Energy," Bulletin of the Seismological Society of America, vol. 70, No. 1, Feb. 1980, pp. 1-27.

\* cited by examiner

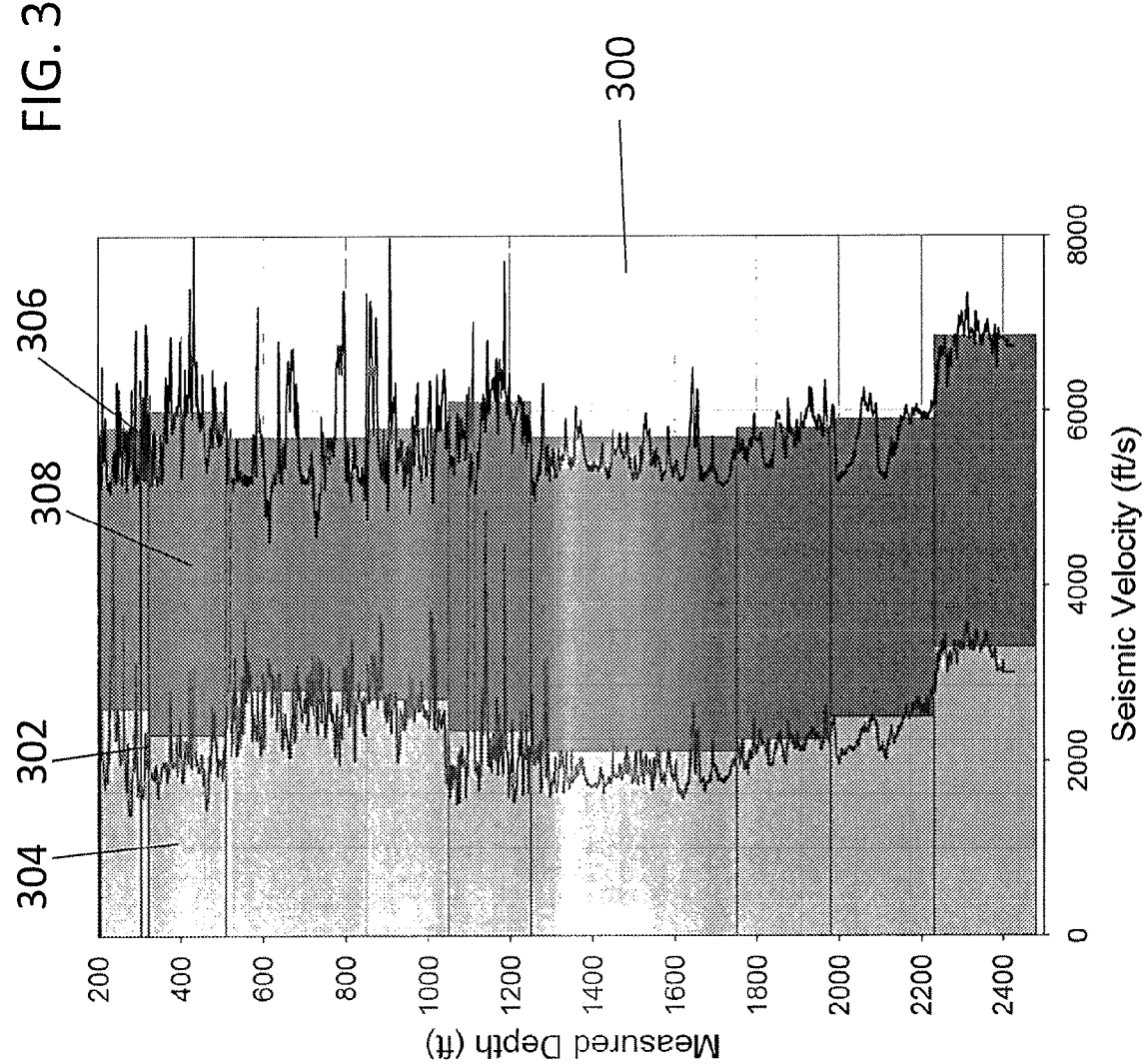

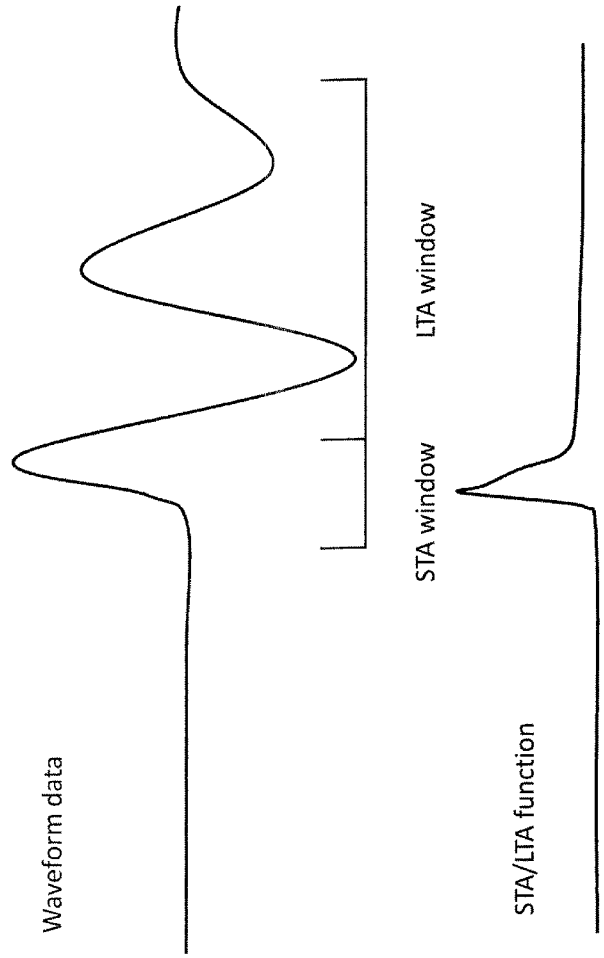

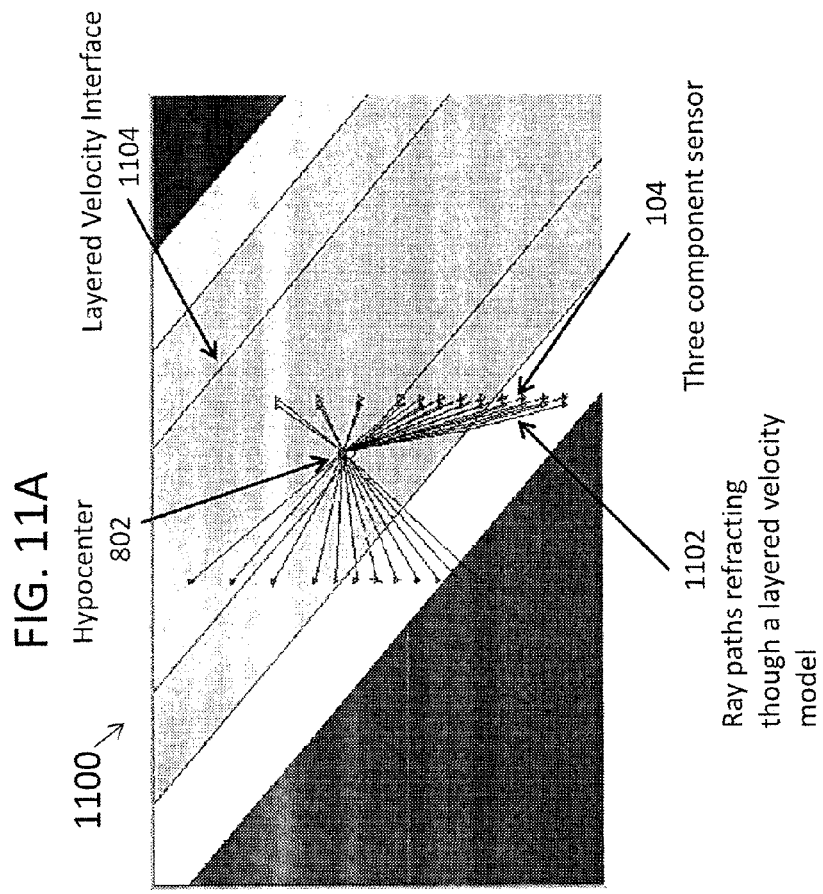

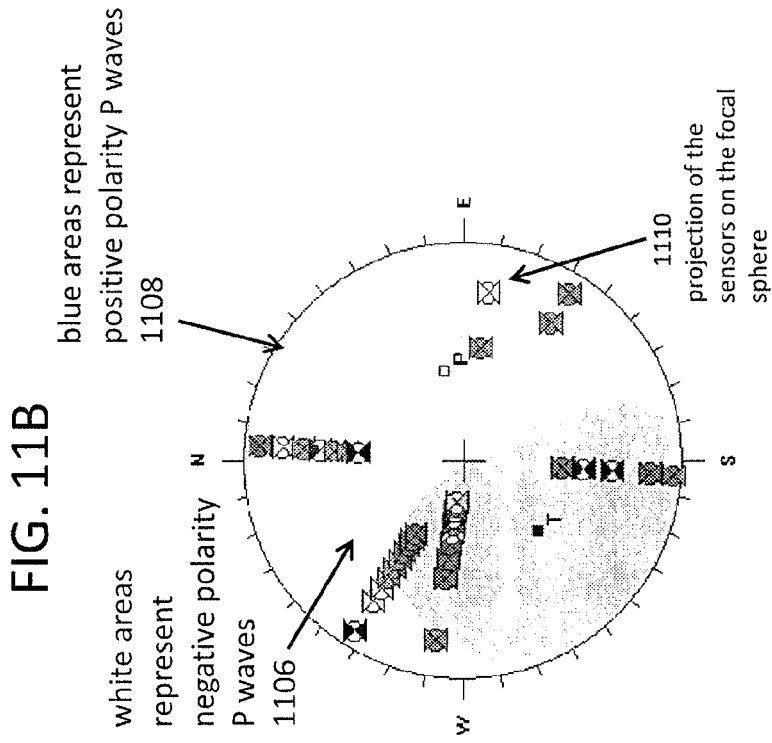

HYBRID SEISMIC SENSOR NETWORK

FIELD

This document describes methods and systems for monitoring seismicity, including reservoir-induced seismicity, using a hybrid seismic network.

BACKGROUND

Hydraulic fracturing is used to fracture rock surrounding a treatment well and pump the created fractures with a mixture of fluid and granular media (proppant) to enhance the permeability of the rock formation adjacent the treatment well. If the formation contains a hydrocarbon reservoir, treatments such as hydraulic fracturing seek to increase the production of the reservoir by creating pathways through which the hydrocarbons can flow to the treatment well. A typical scenario is in gas-bearing shale formations where the inherent permeability of the rock is too low to allow for efficient drainage of the reservoir. Hydraulic fracturing allows for the gas trapped in pore spaces of the shale to be produced, even from long distances from a production well, due to the enhanced permeability of the hydrocarbon-bearing formation that the injected proppant imparts.

In the process of creating and reactivating cracks in the formation, hydraulic fracturing generates small-scale seismic events. This seismic energy generated by these events propagates away from the location of the fracture, which is known as the hypocenter. These seismic events, called microseismic events, typically measure less than Mw0 on the moment magnitude scale. In contrast, earthquakes that are felt by humans and reported on surface typically reach magnitudes of Mw3 or more. Moment magnitude (Mw) is a parameter that involves characterization of the low-frequency spectrum of the seismic or microseismic event.

Many injection processes, including for example hydraulic fracturing and cyclic steaming, are monitored through the use of microseismic monitoring. Hydraulic fracturing and cyclic steaming are capable of generating thousands of micro-earthquakes with magnitudes typically ranging from −Mw4 to −Mw1. The instrumentation and configuration of the microseismic monitoring networks are typically chosen with this magnitude range in mind, and the relatively high frequency signals are recorded with geophones with the bandwidth appropriate for accurate spectral characterization.

A seismic monitoring network that enhances frequency range for monitoring seismic events while maintaining the location accuracy from monitoring proximal to the reservoir is desirable.

SUMMARY

In one aspect there is described a system for monitoring seismicity during fluid injection at or near a hydrocarbon reservoir comprising: a first set of seismic sensors for deployment at a site for collecting seismic data; a second set of seismic sensors for sub-surface deployment at the site at a depth lower than the first set of seismic sensors for collecting seismic data, the first set of seismic sensors having a lower frequency response than that of the second set of seismic sensors; and a data collection system in communication with the first and second set of sensors.

In another aspect there is described a method for monitoring seismic events induced at or near a hydrocarbon reservoir, comprising: deploying a first set of seismic sensors at a site for collecting seismic data; deploying a second set of seismic sensors at the site at a depth lower than the first set of seismic sensors for collecting seismic data, the first set of seismic sensors having a lower frequency response than that of the second set of seismic sensors; and collecting seismic data generated by the first set and second sets of seismic sensors for seismic events.

Other aspects and embodiments, such as for example systems operating in accordance with above methods, and computers and stored algorithm embodying instructions to operate in accordance with the above methods, will be evident from the brief description, detail description and accompanying FIGS.

BRIEF DESCRIPTION OF THE DRAWINGS

Reference will now be made, by way of example, to the accompanying drawings which show example embodiments of the present description, and in which:

FIG. 3 is a graph showing an example seismic velocity model showing seismic velocity as a function of depth for a reservoir similar to the reservoir of FIG. 1.

FIG. 5 is an illustration representing an example seismic waveform and an example STA/LTA function derived from the waveform, which example function represents a microseismic event.

FIG. 9 is graphical illustration of corner frequency determination employing a Brune model fit for the P wave of a microseismic event of.

FIG. 11A is a graphical illustration of reflecting and refracting microseismic energy radiating from a hypocenter.

FIG. 11B is a contour plot of the P wave showing positive and negative polarity P waves of FIG. 11A mapped on a focal sphere, with the projection of the applicable sensors on the focal sphere.

DETAILED DESCRIPTION

Figure 1:
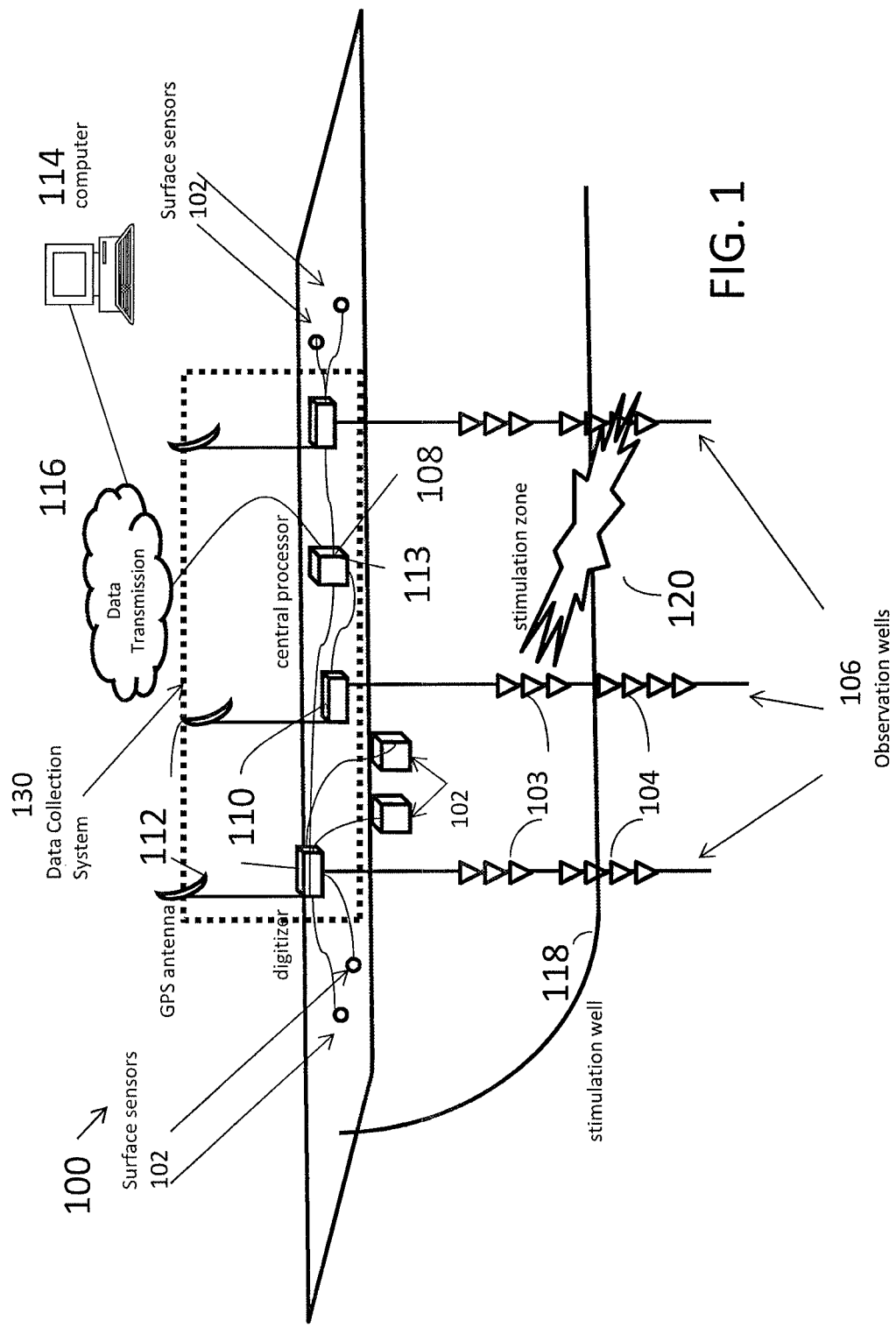
FIG. 1 is a schematic illustration of an example hydraulic fracturing monitoring system deployed to collect microseismic data caused by hydraulic fracturing from a stimulation well of a reservoir.

As noted above, the instrumentation and configuration of microseismic monitoring networks are typically chosen to monitor microseismic events having a relatively high frequency and low magnitude. The signals generated by such events are often measured with seismic sensors such as geophones having a sensitive bandwidth appropriate for accurate spectral characterization of signals within the typical microseismic event range.

Commonly, geophones are passive mechanical velocity sensing devices based on a mass-spring system where movement of a reference mass is measured. In the absence of movement the geophone reference mass remains at rest and therefore does not provide any signal relating to the physical orientation of the device. A geophone's ability to detect low frequencies is governed by the physics of a mass-spring system and typically requires physically larger devices to detect increasingly lower frequencies. A similar limitation exists for specific types of accelerometers (e.g., a piezoelectric based accelerometer only outputs charge relative to the changing compression of the crystal). By way of example, 15 Hz geophones are commonly used for microseismic event monitoring in the context of hydraulic fracturing. Such geophones have a corner frequency of 15 Hz and are likely to experience magnitude saturation when used to measure a seismic event that generates signals that are lower than 15 Hz.

Additionally, the recording parameters used in microseismic monitoring systems typically trigger only short-time measurement windows once an event has been detected. While these parameters may be acceptable for the characterization of small, higher frequency magnitude events, they are not ideal for the characterization of larger magnitude events with Mw>0 to approximately Mw3 because the lower frequency signals emitted by these events will not faithfully be recorded. While the majority of events detected will have moment magnitudes between −Mw2 to Mw0, when relatively uncommon macro events with magnitudes Mw>0 to approximately Mw>3 do occur, it is useful in at least some applications to understand their behavior and accurately obtain estimates of magnitude for any risk and hazard assessments. For example, the injection of fluids during a hydraulic fracture treatment may cause fault structures in the area to slip resulting in the occasional felt earthquake.

Accordingly, the present disclosure describes a hybrid sensor array with both high-frequency and lower-frequency seismic sensors that may in at least some environments mitigate against the spectral bandwidth and time window limitations of existing microseismic monitoring systems. In at least some applications, the system described herein may assist in characterizing events both within conventional microseismic magnitude range as detected using conventional downhole geophone arrays and larger events that are out of conventional range and that occur as a result of reservoir injection activities, thereby enhancing the overall reservoir management system in steam or hydraulic fracturing applications.

System Overview

FIG. 1 is a schematic illustration of a hydraulic fracturing monitoring system 100, according to an example embodiment, deployed to collect seismic data from seismic events caused by fluid injection at or near a hydrocarbon reservoir. Fluid injection could for example include hydraulic fracturing at a stimulation zone 120 of a stimulation well 118 at the site of the reservoir. Referring to FIG. 1, a plurality of seismic sensors 102, 103, 104 measuring ground displacement or one of its derivatives (e.g., velocity or acceleration) are deployed at the site in the vicinity of the expected microseismic activity. The plurality of sensors 102, 103, 104 are deployed throughout the vicinity of the expected microseismic activity either at ground level (surface sensors 102), or below ground level (downhole sensors 103, 104) down one or more observation wells 106. Out of use stimulation wells can be used as observation wells if available. The seismic sensors 102, 103, 104 can include, but are not limited to, geophones, accelerometers, or any other device that measures ground motion. For example, downhole sensors 103, 104 that are deployed in observation wells 106 may include three-component geophone arrays. The sensors 102, 103, 104 are configured to record data corresponding to ground motion corresponding to the elastic waves generated by the microseismic activity (notably the Primary (P) and Secondary (S) waves). As will be explained in greater detail below, at least some of the sensors have different sensitive frequency and magnitude ranges than other sensors within the system.

The sensors 102, 103, 104 are connected to provide signals to a data collection system 130 that includes at least a computing device 108 such as a central processing unit (CPU), for example a Dell R300, operating in accordance with computer program instructions stored in memory, such that the electronic signals generated by the sensors can be captured on a local storage device (for example, persistent storage 113 associated with computing device 108), or transmitted for remote storage. The data collection system 130 can include one or more digitizers 110 for digitizing data collected by the plurality of sensors 102, 103, 104. For example, digitizers 110 could be implemented using a digitizer sold under the trademark Paladin by ESG Solutions Inc., of Kingston, Ontario, Canada, Digitizers 110 can time-stamp collected data using a GPS synchronized time source 112 so that the data collected are precisely time-synchronized across all sensors 102, 103, 104. The time stamped data collected by the digitizers 110 from the plurality of sensors 102, 103, 104 can be transmitted to the local data storage device 113 where the data from the plurality of sensors 102, 103, 104 are combined in computer 108 to arrive at a time-synchronized record of the microseismic activity captured by the plurality of sensors 102, 103, 104.

Figure 2A:
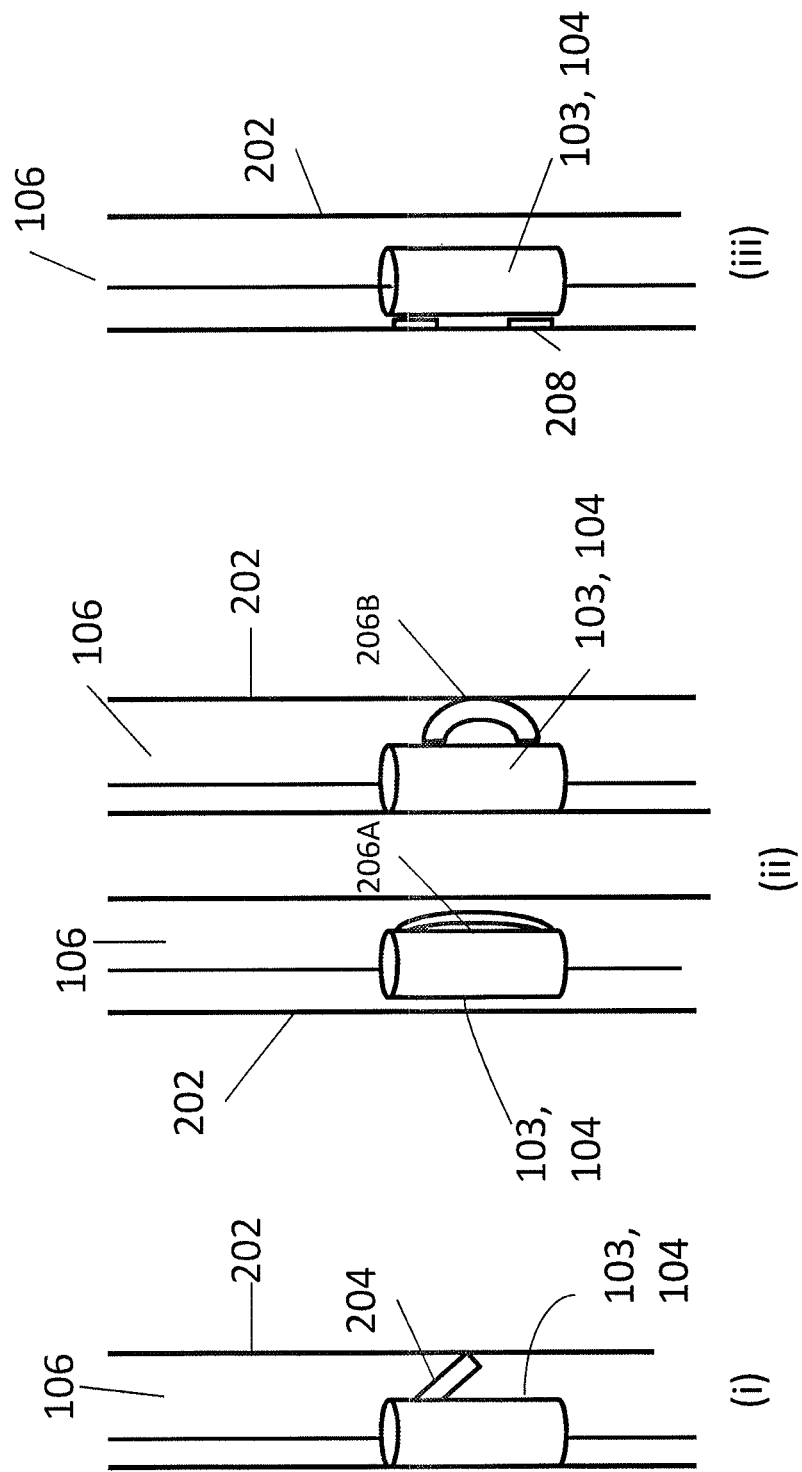
FIG. 2A is a schematic cross-sectional view showing alternate seismic sensor couplings to affix the sensors to a borehole of an observation well in the hydraulic monitoring system of FIG. 1.
Figure 2B:
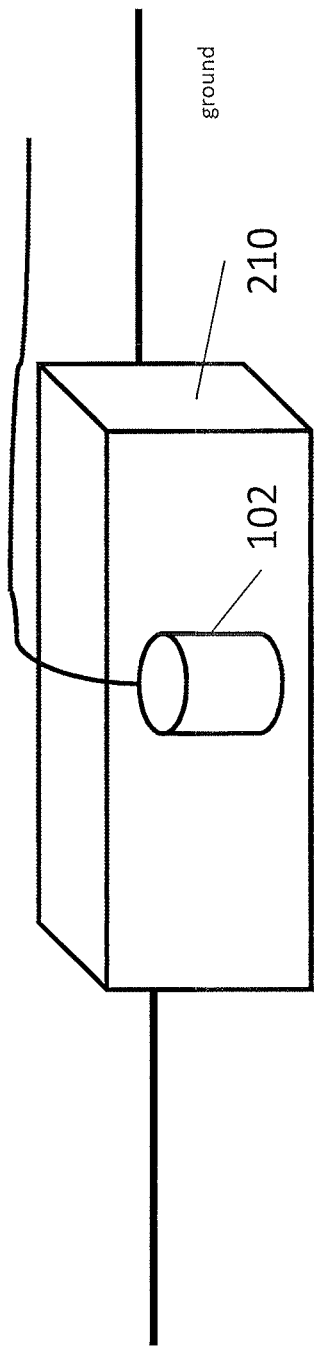
FIG. 2B is a schematic cross-sectional view showing how a seismic sensor may be positioned on the ground surface above a reservoir in the hydraulic monitoring system of FIG. 1.

Referring to FIG. 2A, in some applications the microseismic activity the sensors 103, 104 can be mechanically or magnetically affixed to the casing 202 of the borehole of the observation well 106. For example, FIG. 2A shows three possible ways of affixing the sensors 103, 104 to the borehole casing 202, including: (i) the use of a coupling arm 204, (ii) a bowspring (bowspring 206A unsprung for deployment; bowspring 206B sprung to couple to borehole), or (iii) magnets 208. Other means of affixing a sensor 103, 104 to the borehole casing 202 could also be used—for example, the sensors 103, 104 could be fixed in place with concrete. As shown in FIG. 2B, surface sensors 102 can be enclosed in a protective vault or case 210, which may for example be located on a concrete platform and buried at surface.

Operating algorithms and data, such as models, can be stored and processed locally on the memory, CPU and storage device of on-site computing device 108 previously mentioned, or alternatively, the collected seismic data can be transmitted or otherwise transported to a remote location, for example across a computer network 116 such as the Internet, for processing on a remote computer 114 having associated memory and storage device for the algorithms and data. The algorithms may be stored in memory in the form of computer programs which computer programs when operated on the computer cause the computer 108, 114 to carry out the algorithms using stored or received data, and storing the results of such algorithms following processing. The computers 108, 114 may have an associated monitor to allow an operator to view the data or graphical representations thereof and human interface devices such as a pointing device (for example, a mouse) and a keyboard for operator control, such as requests for particular graphical representations generated by the algorithms, and a display screen for viewing of the data or graphical representations. It is recognized that the various functions of the computers 108, 114 could be distributed across more than one computer 108, 114, and such distributed computers could interact locally or remotely, for example through a computer network such as the Internet. Furthermore, the algorithms described in this description can operate independent of the sensing system described in this description. The algorithms can be operated in a central location for a plurality of remote sensing systems. The algorithms can be used in realtime as data is collected provided that computers and communication networks of sufficient speed and capacity are available. Alternatively, sensed data can be stored for later use in conjunction with the algorithms.

As noted above, a passive geophone's ability to detect low frequencies is governed by the physics of a mass-spring system and typically physically larger devices are required to detect lower frequencies. An enhancement to lower frequency detection from a physically small device is to measure the force it takes to hold the mass still. A further enhancement is to ensure that the mass is held in its centre position, referred to as force balancing. There are a variety of force-balanced technologies available ranging from enhanced geophone performance at low frequencies to MEMS (micro-electronic mechanical machines) accelerometers capable of measuring the static force of gravity. In the latter case, the effort taken to keep the reference device centred is proportional to the gravitational vector. The final selection of an appropriate device for low-frequency detection depends on factors ranging from physical size to expected reliability when installed.

Accordingly, in an example embodiment surface or near surface sensors 102 are implemented in the form of force balanced accelerometer (FBA) sensors in order to provide lower frequency measurements, and downhole sensors 103 and 104 are implemented using geophones that have different frequency responses and placed at different depths—for example the frequency corner or minimum frequency of the geophones used for downhole sensors 104 can be higher than that of the geophones used for downhole sensors 103, with the higher frequency geophone sensors 104 being located at a deeper level than the lower frequency geophone sensors 102. FBA sensors 102 have an even lower minimum frequency response than both sets of geophone sensors 103 and 104.

By way of non-limiting example, in one embodiment the downhole sensors 103 of monitoring system 100 are implemented in the form of eight-level arrays of 4.5 Hz three-component geophones close to surface (for example, within 150 m) and sensors 104 are implemented in the form of 15 Hz three-component omni-directional geophones deployed deeper than geophone sensors 103, in 11 vertical downhole observation wells 106. A network of five surface deployed, force-balanced accelerometer (FBA) sensors 102 augment the downhole array, two of which are collocated with observation wells 106. In one example, the approximate total areal extent of this array of sensors 102, 103 and 104 could be approximately 150 km2 (12.7 km×12.2 km). In a typical configuration, geophone sensors 104 may be deployed at or near the depth of the stimulation zone 120, with geophone sensors 103 located between the surface and the stimulation zone 120.

When a sensor 102, 103, 104 is triggered, the recording windows for the respective sensors are a function of the type of sensor 102, 103, 104. By way of non limiting example, in one possible application, for the 15 Hz and 4.5 Hz geophone sensors 103, 104, the recording window is 6.5 sec long while the FBA sensors 102 employ recording window lengths from 1 min to 5 min, depending on the separation between the P and the S waves. These longer windows ensure that the waveforms from more distant events are captured. Events located in the reservoir may for example have a total location accuracy from around 50 m to 100 m, although when events are detected on certain combinations of arrays, event locations may become more accurate.

In an example embodiment, the FBA sensors 102 have a flat response from 0 Hz to the Nyquist frequency. Active electronic devices inherently add their own noise signature to the system; often the noise signature is more significant at lower frequencies (referred to as 1/f noise). Accordingly, to mitigate against the noise-floor of the system 100 being raised by the FBA sensors 102 and obscuring the signals of interest, a low frequency limit on the FBA sensors 102 can be imposed through the respective digitizer 110 (for example, 0.7 Hz). Geophones are typically quieter than FBAs because they do not generate electronic noise, but as frequency increases the advantage of the geophone is lost because velocity rolls off at 20 dB per decade. However, in the frequency band of interest for microseismic events, typically with dominant frequencies up to 300 Hz-500 Hz, geophone elements can faithfully reproduce incoming signals.

In an example embodiment, during operation of system 100, signals from sensors 102, 103 and 104 are continuously recorded at their respective distributed digitizers 110 as an independent data stream for each class or type of sensors (which for example may include 32 bit data recorders at each network node location), with sampling carried out at ¼ ms or 4 kHz for all sensor data streams. In an example embodiment, signals from the FBA sensors 102 are further decimated, for example to a 1 k Hz sampling rate, to improve the dynamic range. In some example applications, all recorded signals, including GPS time stamps for timing accuracy and triggering, are processed using a simple long-term average to short term average approach.

In an example embodiment, the measured moment magnitudes are initially determined for each sensor class or type—for example a sensor class specific Mw is determined for each event for (i) the FBA sensors 102; (ii) the 4.5 Hz geophone sensors 103 and (iii) the 15 Hz geophone sensors 104. Over a large network of stations, the estimates from each class of sensor can be averaged together, with some weights that can be applied to account for any unique instrument features or a number of other factors (e.g., corrections for recording on the ground-air interface and attenuation). In some embodiments, a determination is made if the bandwidth for a particular sensor type does not include a sufficient range of frequencies around the corner frequency of the seismic event, and in such cases, the measurements from such sensor types are excluded from the calculation of the source parameters. Hanks and Kanamori (1979) stipulate how to calculate moment magnitude from seismic moment, which itself is measured from the long-period spectral amplitudes of the displacement spectrum (see also Baig and Urbancic, 2010, for an overview of these calculations as applied to microseismic data) corrected for focal mechanism, source and site conditions, and geometrical spreading (Brune, 1970). This low-frequency plateau is a feature of many source models (e.g., Brune, 1970; Boatwright, 1980) that characterize the spectrum by the long-period level, corner frequency, and attenuation quality factor. From these quantities assessed from the displacement spectrum, the source parameters such as seismic moment, radiated energy, source radius can be calculated.

Processing Sensor Data

In order to provide an example of how various quantities can be determined from the data streams recorded from sensors 102, 103, 104, a description of how sensor data from sensors 102, 103 and 104 can be processed will now be provided. In an example embodiment the data streams acquired from the different types of instruments are combined and the quantities described below are calculated using the data from one or more of the sensor specific data streams depending on which of the sensor types is or are the most appropriate instrument(s) given the frequency content of the data.

Referring now to FIG. 3, a model of seismic velocities that is predetermined for the monitoring site can be used to locate accurately microseismic events. This seismic velocity model 300 can be constructed from well log information where a sensor commonly referred to as a dipole sonic logger (not shown) measures wave velocities in the vicinity of the borehole 106 in which it is located. A model of velocities can also be provided by other means, such as a vertical seismic profile or by seismic profiling through reflection/refraction surveys. This information can be used in determining the composition and structure of the reservoir in the vicinity of the borehole 106. As shown in FIG. 3, the seismic velocity model 300 will show the measured seismic velocity of both the P and S waves in relation to its depth (S wave sonic log velocity 302, S wave block velocity 304, P wave sonic log velocity 306 and P wave block velocity 308).

Figure 4B:
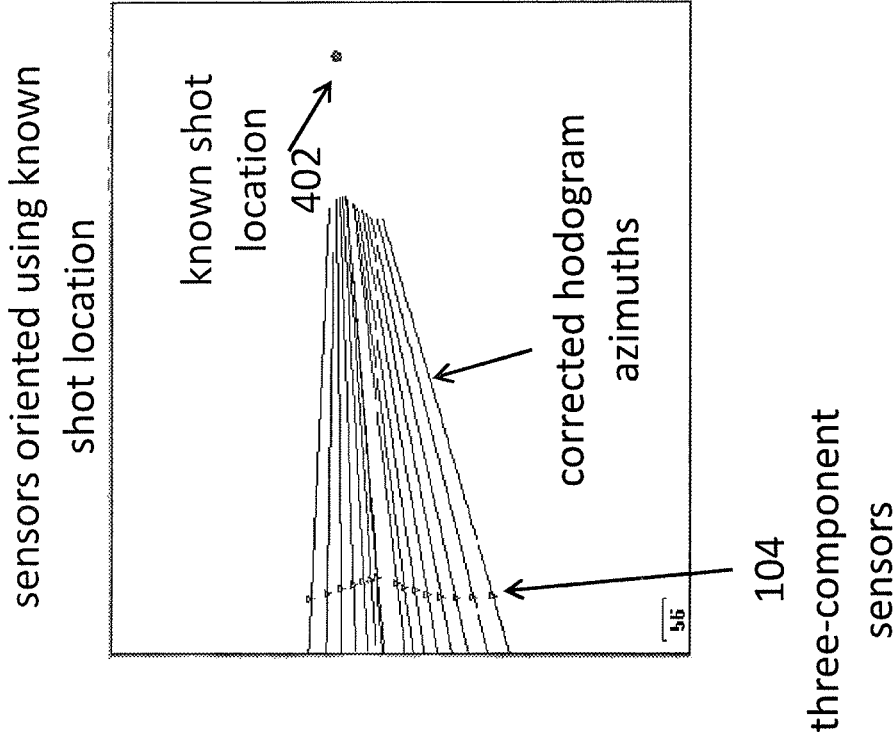
FIG. 4B is a schematic illustration of the deployed array of sensors of FIG. 4A and the corrected hodogram azimuths after sensor calibration using the known shot location.
Figure 4A:
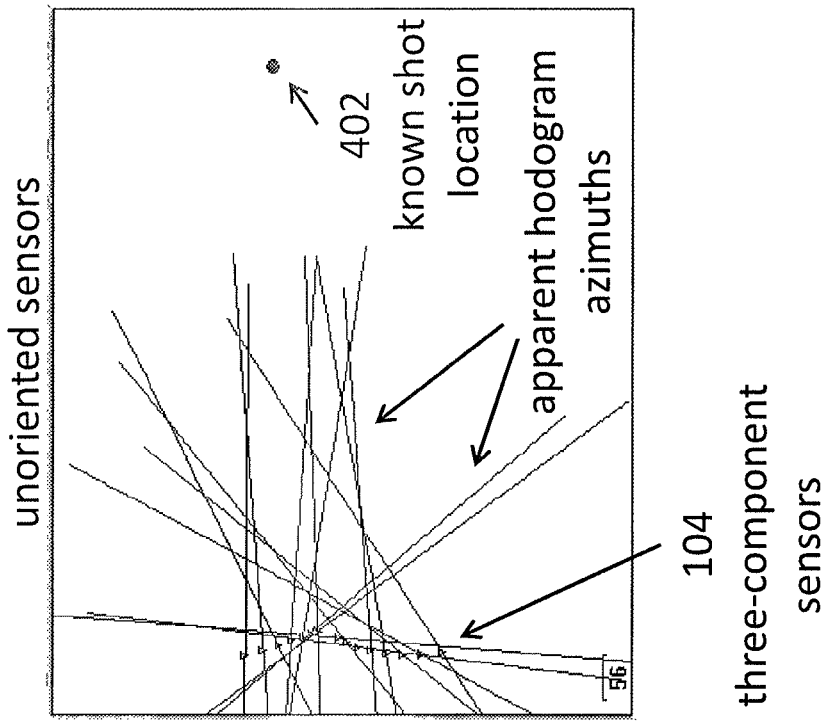
FIG. 4A is a schematic illustration of a deployed array of sensors for the system of FIG. 1 and apparent hodogram azimuths for a known shot location prior to sensor calibration.

Referring to FIGS. 4A and 4B, prior to recording microseismic activity the sensors 102, 103, 104 are calibrated. In some example embodiments, surface sensors 102 may include physical markings that allow them to be manually oriented in a known orientation. Typically, sub-surface sensors 103, 104 will need to be electronically calibrated by firing a test shot in a known location and measuring the result. In this regard, FIG. 4A is a graphical representation of data collected by the sensors 104 in an uncalibrated system. FIG. 4B is a graphical representation of data collected by the sensors 104 in a calibrated system. Calibration is usually accomplished by recording the microseismic signals from an event with a known location 402, such as a perforation shot in a well, an explosive charge placed in a downhole well or on the surface, or a seismic vibrator (vibroseis) truck on the surface. Knowing that the primary (P) wave energy from these sources will be aligned with the direction to the source, the previously unknown orientation of a sensor can be determined. For example, a rotation matrix can then be determined for each of the sensors 104 to apply to subsequently measured signals and correct for any variations in the orientations of the respective sensors 104. Sensors 103 can be calibrated in a similar manner, as can surface sensors 102 if required.

Referring now to FIG. 5, trigger logic can be used for automated identification of when microseismic events occur in signals collected by the sensor arrays. For example, an algorithm can determine a short term averaging/long term averaging (STA/LTA) function from a microseismic waveform (signal) by taking the root means square (RMS) average of the signal over a short window and a long window. The short term average is divided by the long term average for each channel to obtain the function. Potential events are identified when this function is strongly peaked over a number of channels. Because different size events will have different dominant periods, different sensor types can have variably-sized STA/LTA windows, appropriate to the range of magnitudes that the particular sensor instrument is most attuned to. Other types of trigger logic can be used to identify potential events, usually consisting of scanning the data for relatively large amplitudes on a number of different channels. Manual intervention by operators through the human interface device of computer device 108, 114 in response to data displayed on a display can allow for manual confirmation to the algorithm of automated identification of when microseismic events occur, or manual identification to the algorithm of when microseismic events occur.

Figure 6:
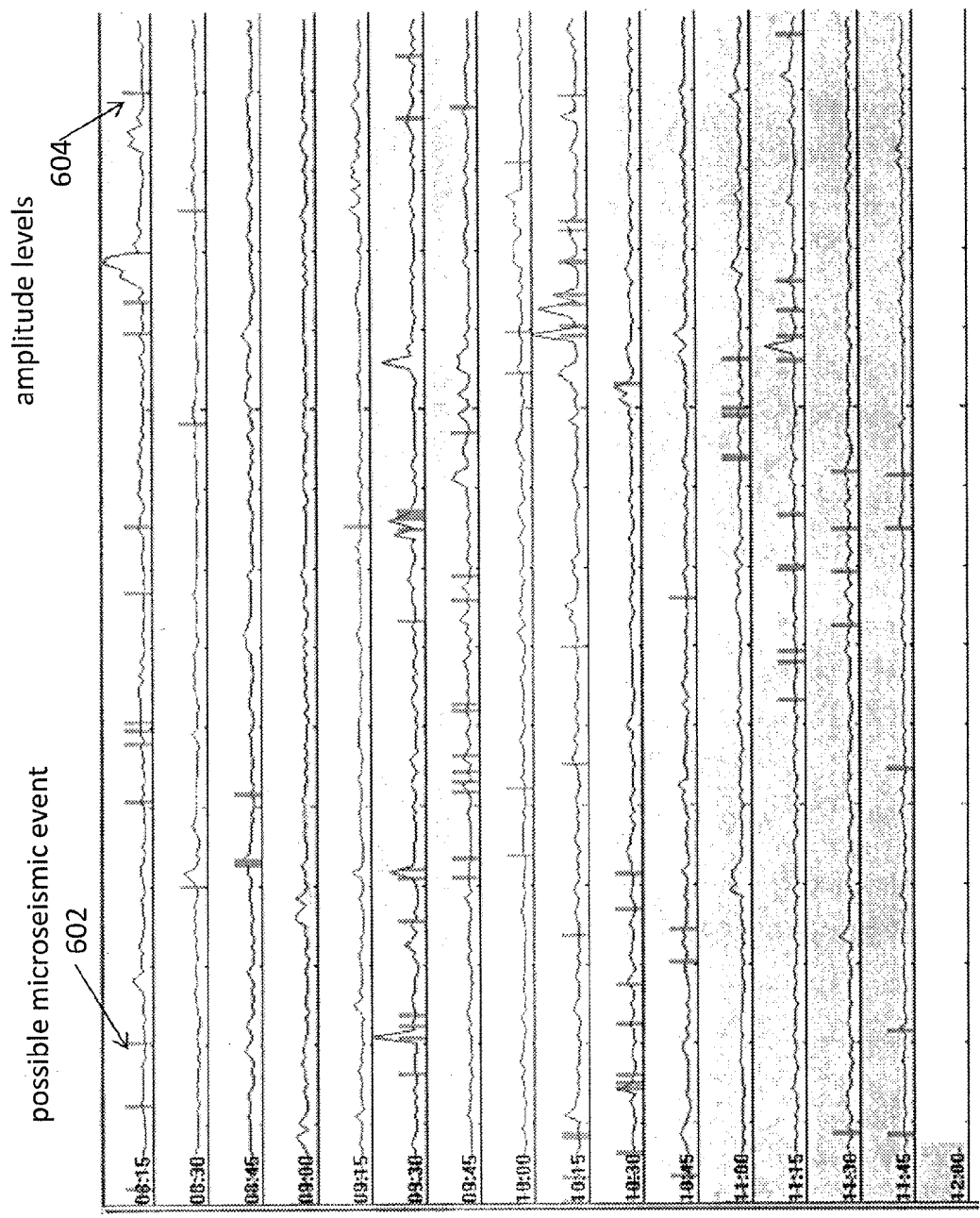
FIG. 6 is a time-based graph depicting microseismic data recorded by the sensors of FIG. 1 and potential microseismic events identified, for example, using the trigger logic of FIG. 5.

Referring now to FIG. 6, the time-stamped data collected by the plurality of sensors 102, 103, 104 is analyzed to identify the time of potential microseismic events. Using the STA/LTA algorithm as described above (see also A Comparison of Select Trigger Algorithms for Automated Global Seismic Phase and Event Detection, Withers et al., Bulletin of the Seismological Society of America, Vol. 85, No. 1, pp 95-106, February 1998, the contents of which are incorporated by reference into this detailed description), potential microseismic events 602 are detected when this function is strongly peaked over a number of channels, wherein a channel is the data collected by a single sensor.

Figure 7:
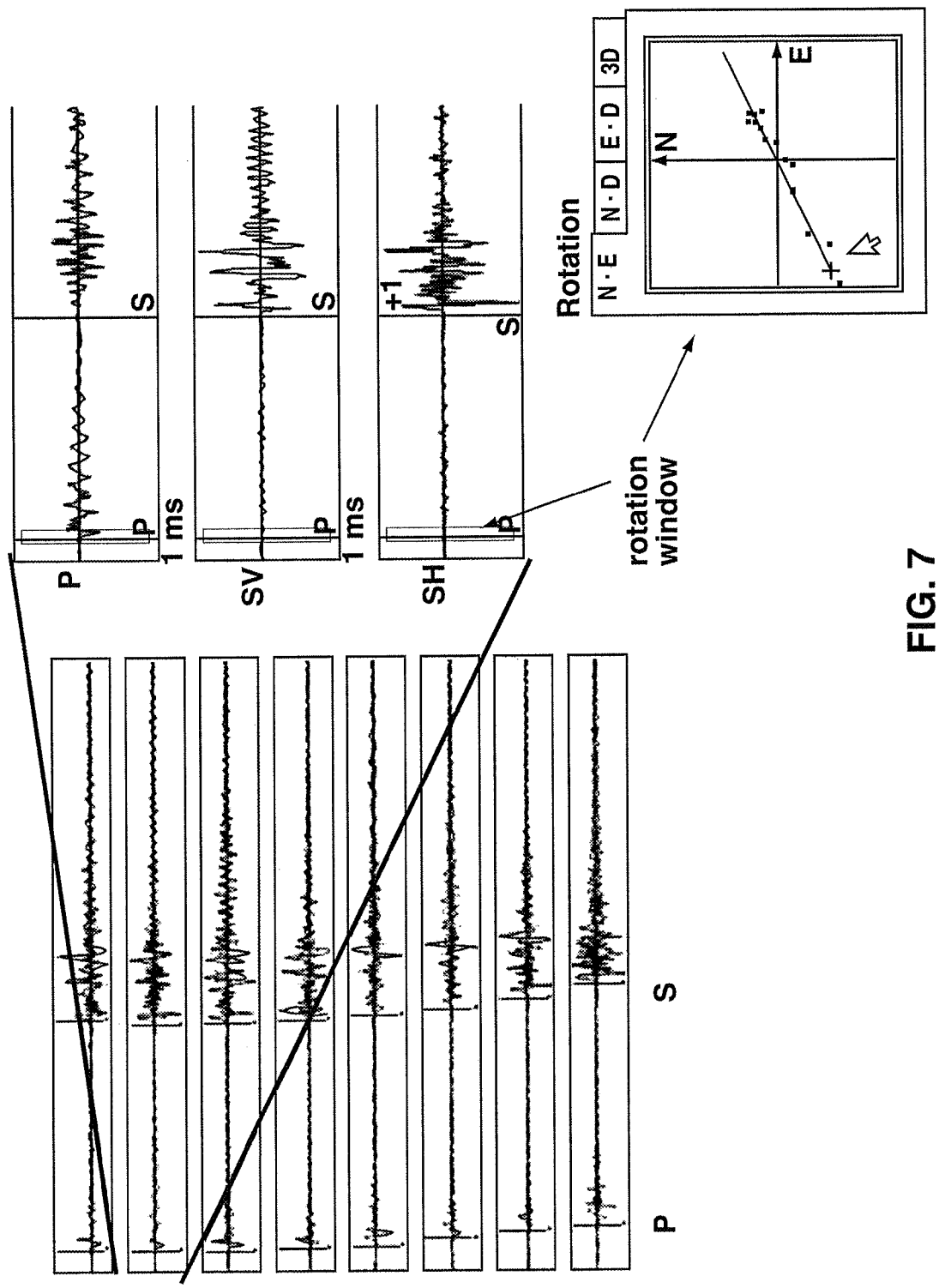
FIG. 7 is a graphical representation of travel time and direction information for individual sensors of FIG. 1 for an example microseismic event identified in FIG. 6 derived from P and S waves utilizing $S_V$ and $S_H$ components.

Referring now to FIG. 7, the sensor data corresponding to the timing of the microseismic events 602 identified in FIG. 6 is analyzed for as many of the sensors 102, 103, 104 as the signal-to-noise ratios will allow. The three-component signal captured by the selected sensor 102, 103, 104 is analyzed to determine the direction the waves are propagating, as well as the source of the microseismic activity. When a P wave pick is available for the sensors 102, 103, 104, the window will be placed after this arrival and the three-components of the particle motion should align with the direction of propagation. For secondary (S) waves, the particle motion in the window will be in a plane perpendicular to the particle motion so the normal vector to this plane can be used to determine the direction of propagation. In example embodiments, only one estimate of the particle motion will be assigned to each sensor, and can be variably weighted to between using only the P wave hodograms to only using the S wave hodograms.

Figure 8:
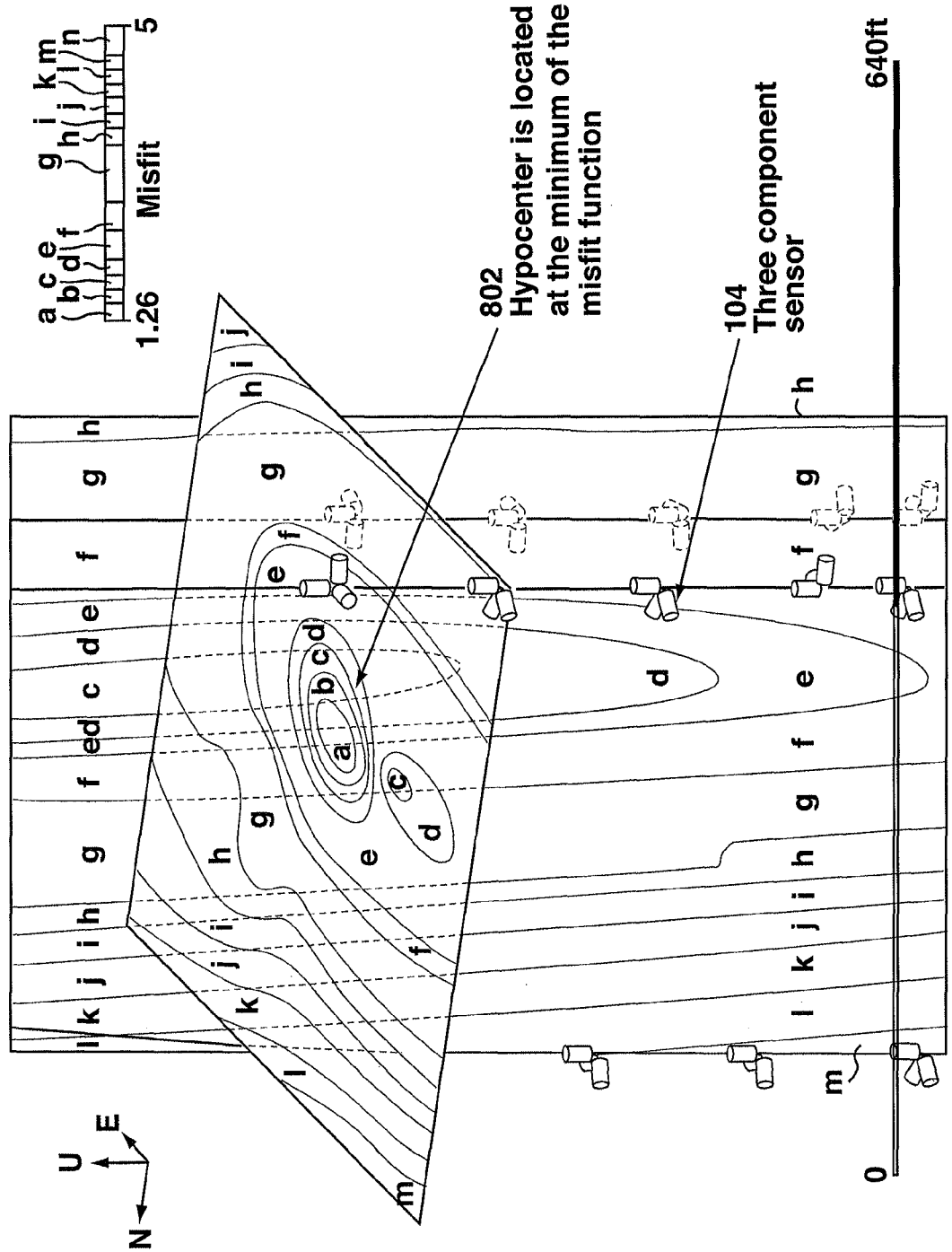
FIG. 8 is a graphical representation of a hypocenter of an example microseismic event derived from travel time and direction information like that shown in FIG. 7.

Referring now to FIG. 8, the objective function is a measure of how well a potential location fits the data measured from the plurality of sensors 102, 103, 104. The objective function is formed according to the description given by Microearthquake Location: A Nonlinear Approach That Makes Use of a Simplex Stepping Procedure (Prugger and Gendzwill, Bulletin of the Seismological Society of America, Vol. 78, No. 2, pp. 799-815, April 1988;) and modified to include S wave traveltimes and hodogram information. The objective function is searched using the simplex algorithm discussed by Prugger and Gendzwill to find the best fitting location, known as the hypocenter 802, based on the data. For example, a search algorithm is applied to locate the area of least misfit between theoretical information and measured data.

Figure 9:
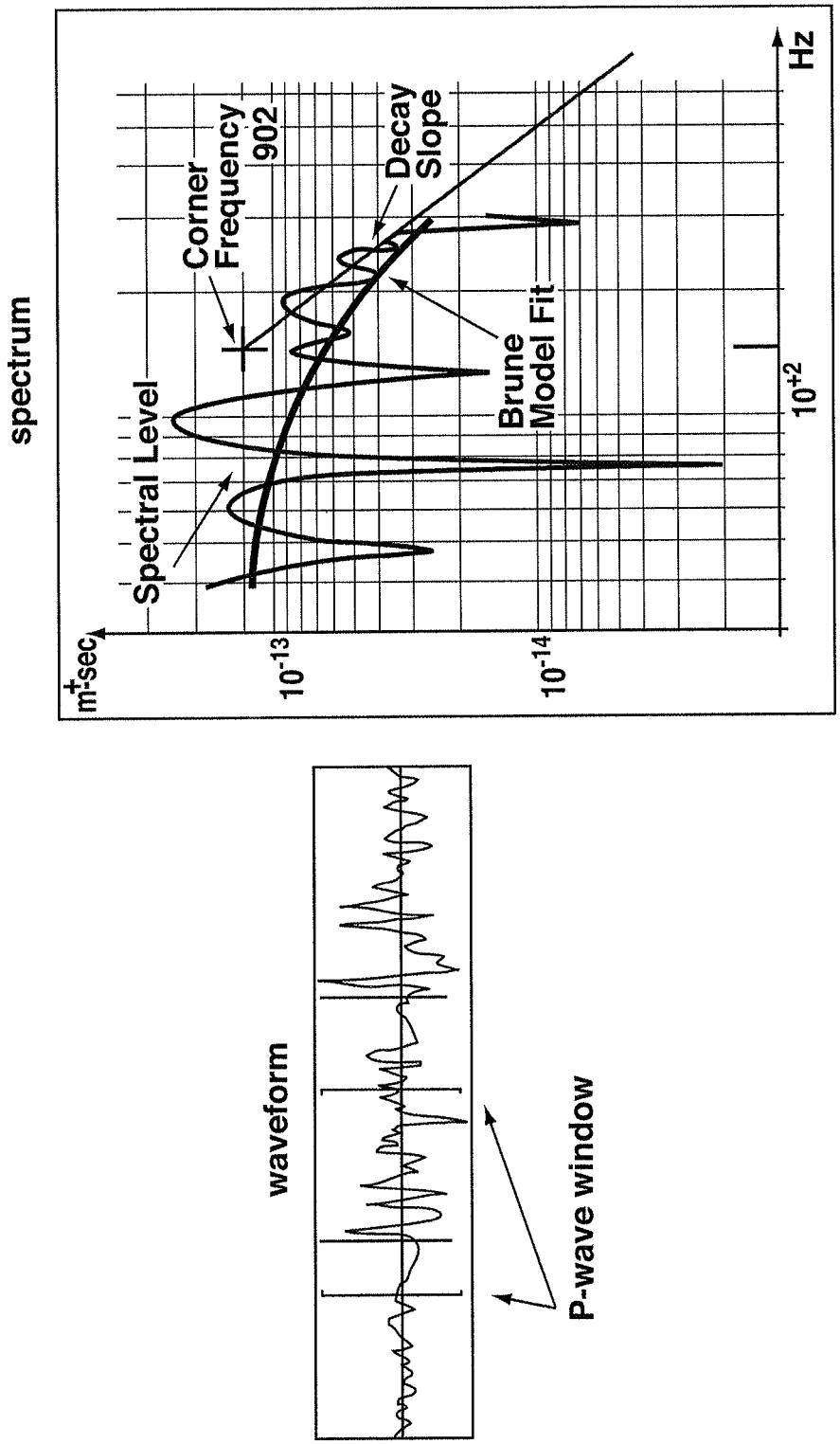

Referring now to FIG. 9, once a hypocenter 802 has been determined, the source parameters can be calculated from the data collected by the sensors 102, 103, 104. Automatic Time-Domain Calculation of Source Parameters for the Analysis of Induced Seismicity (Urbancic et al., Bulletin of the Seismological Society of America, Vol. 86, No. 5, pp. 1627-1633, October 1996; the contents of which are incorporated by reference into this detailed description) outlines examples of algorithms used to calculate source parameters like seismic moment, energy, corner frequency, and a number of other parameters. Integrals in windows after the P and S waves are calculated in the time domain and related to each of these parameters. In the case of source radius, the corner frequency 902 is related to this parameter like those presented by Tectonic Stress and the Spectra of Seismic Shear Waves from Earthquakes (Brune, Journal of Geophysical Research, Vol. 75, No. 26, Sep. 10, 1970) or Spectra of Seismic Radiation From a Tensile Crack (Walter and Brune, Journal of Geophysical Research, Vol. 98, No. b3, Pages 4449-4459, Mar. 10, 1993).

Depending on where the corner frequencies of the measured seismic events fall with respect to the bandwidth of the sensors 102, 103, 104, the source parameters determined from inappropriate sensor types can be biased due to saturation effects. Accordingly, the sensor data that is used for source parameter estimation should be selected from the sensor types having the correct bandwidth or frequency response that is appropriate for the seismic event in order to provide accurate source parameter estimation. Certain source parameters require an estimate of the radiation pattern imposed by the seismic moment tensor to be determined to correct for the effect of the source mechanism on the amplitude of the waveforms. In cases where the moment tensor cannot be determined (due to unfavourable sensor/event geometry), averaged values of the radiation patterns may be used as illustrated by Boore and Boatwright (1984, Average body-wave radiation coefficients, Bulletin of the Seismological Society of America, Volume 74).

Figure 10:
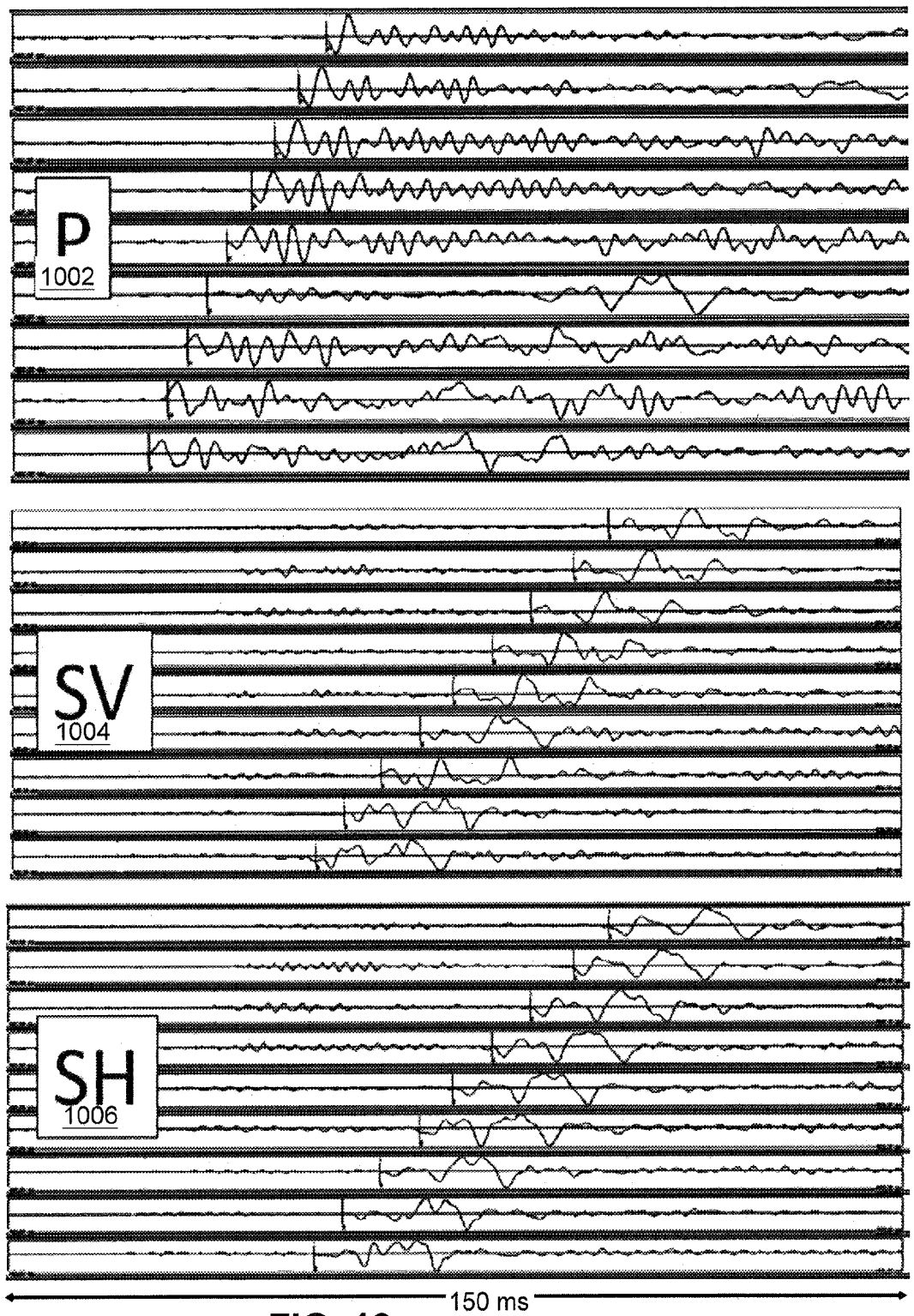
FIG. 10 is a graphical illustration of an example polarity assignment for P, $S_V$, and $S_H$ waves for a microseismic event.

Referring now to FIG. 10, once the hypocenters 802 have been located the moment tensor can be determined by further examining for the polarities and amplitudes of the different seismic phases for each sensor 102, 103, 104. The data collected by the sensors 102, 103, 104 is analyzed to determine its polarity. The S wave motion takes place in a plane perpendicular to the direction of propagations. A common convention is to decompose this plane into SH (horizontal direction) 1006 and SV (perpendicular to SH) 1004. The polarities are measured on each channel with sufficient signal-to-noise ratios, and an uncertainty to this polarization can be assigned. Generally, different phases will be polarized along differing directions, but looking at the onset of these phases, the first motion will be defined as being either positive aligned or negative aligned along these polarization directions.

The data collected by the sensors is also analyzed to determine the amplitude. The amplitudes in a window following the P 1002, SV 1004 and SH 1006 waves can be calculated by integrating the waveforms in the frequency domain. This polarity and amplitude data of these phases of seismic activity make up the seismic moment tensor, and is the first step in determining the seismic moment tensor inversion (SMTI).

Referring now to FIG. 11A, the velocity model defines how to project the amplitude and polarity data as determined in FIG. 10 back to the hypocentre 802 in order to determine the radiation pattern for P, SV, and SH waves. The waves reflect and refract from the source 802 to the sensors 102, 103, 104 according to the velocity model, and the measured amplitudes and polarities are projected back to the source 802 along these reflecting and refracting raypaths. In FIG. 11A a layered velocity model 1100 includes a plurality of layered velocity interfaces 1104 and lines 1102 represent ray paths refracting through the layered velocity module.

Referring now to FIG. 11B, the radiation pattern is the projected P, SV and SH wave polarities and amplitudes projected back to the source. FIG. 11B is a contour plot of the P wave showing positive and negative polarity P waves of FIG. 10 mapped on a focal sphere, with the projection of the applicable sensors on the focal sphere. In particular, a lower hemisphere stereographic projection of the P wave radiation pattern is used to display the moment tensor. White areas 1106 on the plot represent negative polarity P waves; blue (or shaded) areas 1108 on the plot represent positive polarity P waves; symbols 1110 represent projection of the sensors 102, 103, 104 on the focal sphere. With a good spatial sampling around the event, the measured waveform polarities and amplitudes can determine these radiation patterns then determine the moment tensor. An algorithm to perform the moment tensor inversion from waveforms is described in A Fast Evaluation of the Seismic Moment Tensor for Induced Seismicity (Trifu et al., Bulletin of the Seismological Society of America, 90, 6, pp. 1521-1527, December 2000).

The moment tensor inversion consists of six parameters, and as such at least six observations of waveform characteristics need to be made to calculate a solution. However, due to the non-uniqueness of waveform characteristics when only observed from one azimuth, the stability of the moment tensor inversion is improved with increased sampled solid angle of the focal sphere created from the projection of the amplitude and polarization directions along the rays back to the source. That is, the better the azimuthal coverage of the observation wells, the higher degree of the focal sphere will be covered and the more robust the moment tensor solution.

To resolve this potential non-uniqueness the sensors 102, 103, 104 are deployed such that a sufficient degree of azimuthal coverage is achieved. This can be accomplished by deploying arrays of sensors 103, 104 in non-producing or non-treatment wells 106, deploying sensor arrays 102 on or near the surface, or combinations of the above as suited to the local geology. A well 106 providing coverage for more than one azimuth (e.g., a well with a substantial vertical and substantial horizontal component relative to the surface) could also be used. Modeling of the condition numbers of the moment tensor inversion gives an idea of where the moment tensors will behave the most stably.

Figure 12:
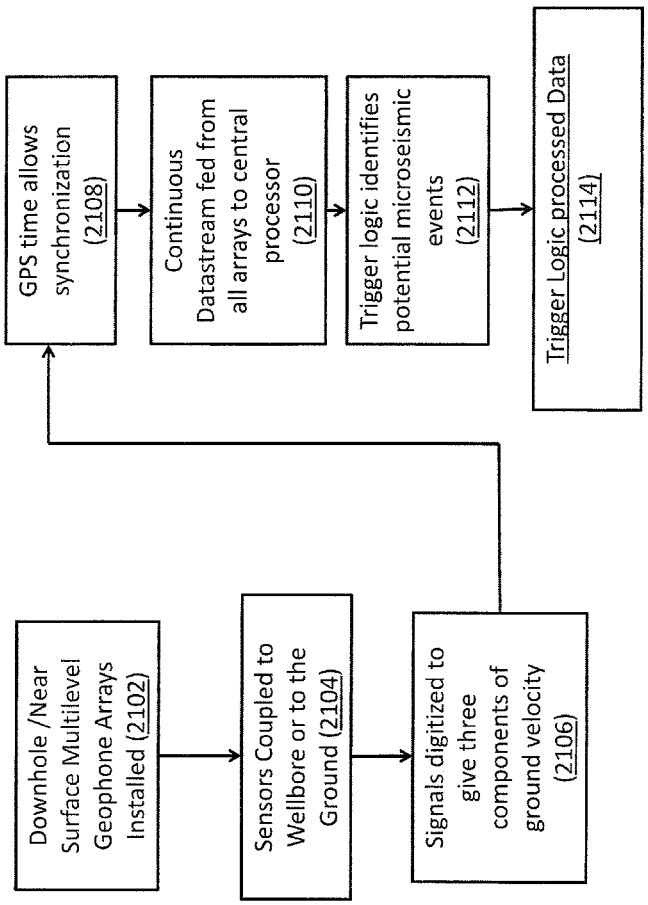
FIG. 12 is a block diagram illustrating an example of how sensors can be used to collect microseismic data.

FIG. 12 provides an example embodiment of how three component sensors 102, 103, 104 can be used to record microseismic data. Three component FBA sensors 102 are deployed on the surface coupled to the ground (Action 2102), and geophone sensors 103, 104 are deployed downhole, coupled to the borehole (Action 2104). The sensors are manually or electronically oriented as described above in respect of FIGS. 4A and 4B. The sensors 102, 104 detect microseismic activity, which is comprised of three components of ground velocity (digitized at digitizers 110) (Action 2106). This data is then time synched with GPS time (from GPS devices 112) (Action 2108) and transmitted to a central processor 108 (Action 2110). Trigger logic such as the STA/LTA logic described above in conjunction with FIGS. 5 and 6 is then used to identify potential seismic events (Action 2112), and the resulting trigger logic processed data 2114 is then further processed as shown in FIG. 13.

Figure 13:
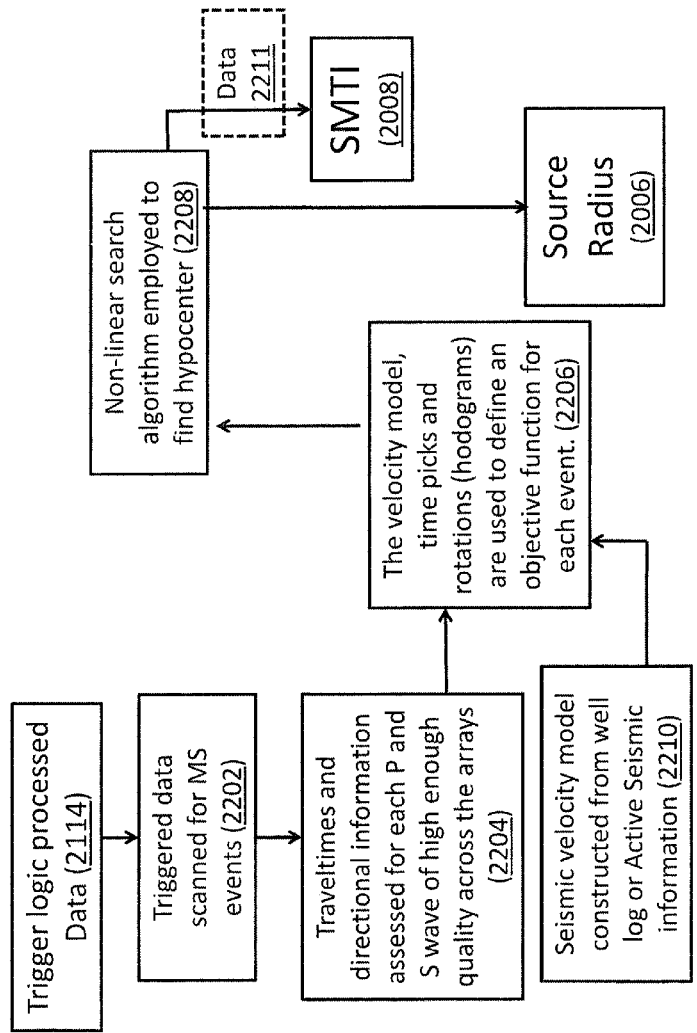
FIG. 13 is a block diagram illustrating an example of how to determine source radius data from trigger logic processed data.

FIG. 13 describes how the source parameters including the source radius 2006 are determined from the trigger logic processed data 2114. Once the data has been processed using the trigger logic as seen in FIG. 12, travel times and directional information for each primary (P) and secondary (S) wave can be determined for those microseismic events determined by the trigger logic (Action 2204). Seismic velocity model information 2210, which provides information regarding the geographic composition of the reservoir, is then incorporated. The objective function for each microseismic event is then determined using the velocity model, the time picks, and the rotations (hodograms) (Action 2206). A nonlinear search algorithm is then used to find the hypocenter of the microseismic event (Action 2208). This results in a set of source radius parameters 2006 associated with the seismic event including, but not limited to, the estimated moment (magnitude) and the source radius. The resulting data 2211 of the nonlinear search are also used in determining the SMTI 2008 as described in further detail below. The method of FIG. 13 corresponds to the activities described above in respect of FIGS. 7-10.

Figure 14:
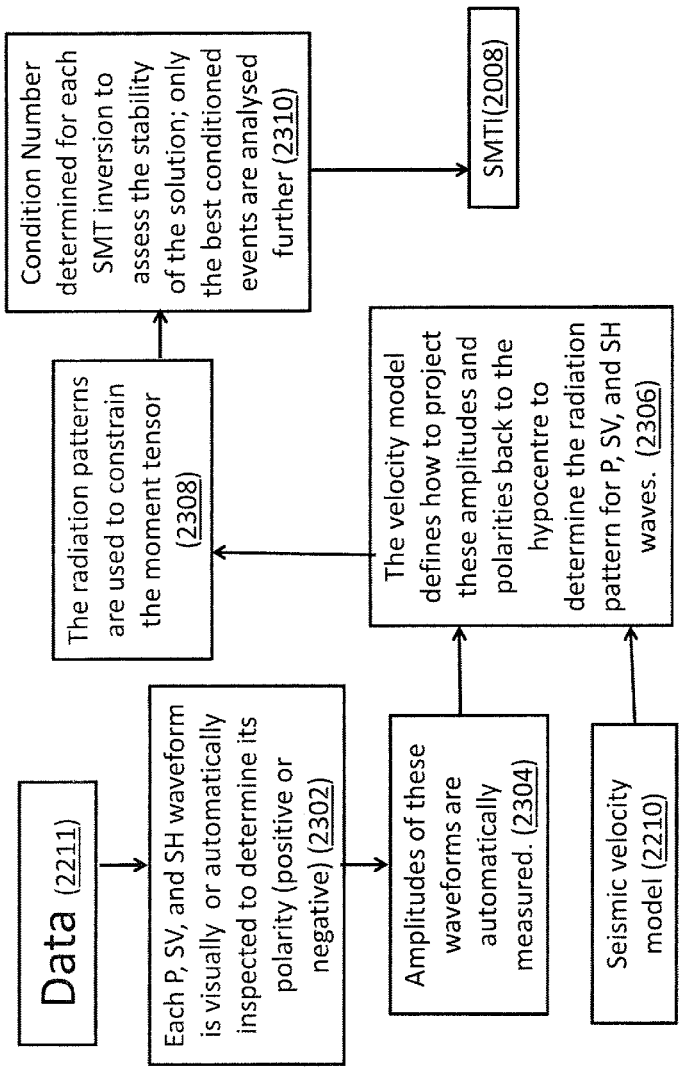
FIG. 14 is a block diagram illustrating an example of how to determine the SMTI from data processed using a non-linear search algorithm to determine the hypocenter of the microseismic event.

FIG. 14 describes how to determine the SMTI data 2008 from the data 2211 processed by the nonlinear search algorithm 2208. Each P, SH, and SV waveform is assigned a polarity as described above in respect of FIG. 10 (Action 2302), and the amplitude of these waveforms are also determined (Action 2304). This information is correlated with the seismic velocity model 2210 to determine how to project the amplitude and polarity data back to the hypocenter to determine the radiation pattern of the P, SV, and SH waves from the hypocenter (Action 2308) as described above in respect of FIG. 11A. The radiation patterns are then used to constrain the moment tensor (Action 2308) as described above in respect of FIG. 11B, and a condition number is determined for each SMT inversion to assess the stability of the solution (Action 2310). The well-conditioned events are then selected as SMTI data 2008 to be analyzed further.

Once the fault plane has been determined using one of the two procedures described above, this information is combined with the source radius data to arrive at the Sensor Type Specific Data, which includes information regarding event location, event type, fracture orientations, spacing, moment (magnitude) and the source radius.

Differentiation Between Data Streams from Different Sensor Types

Figure 15:
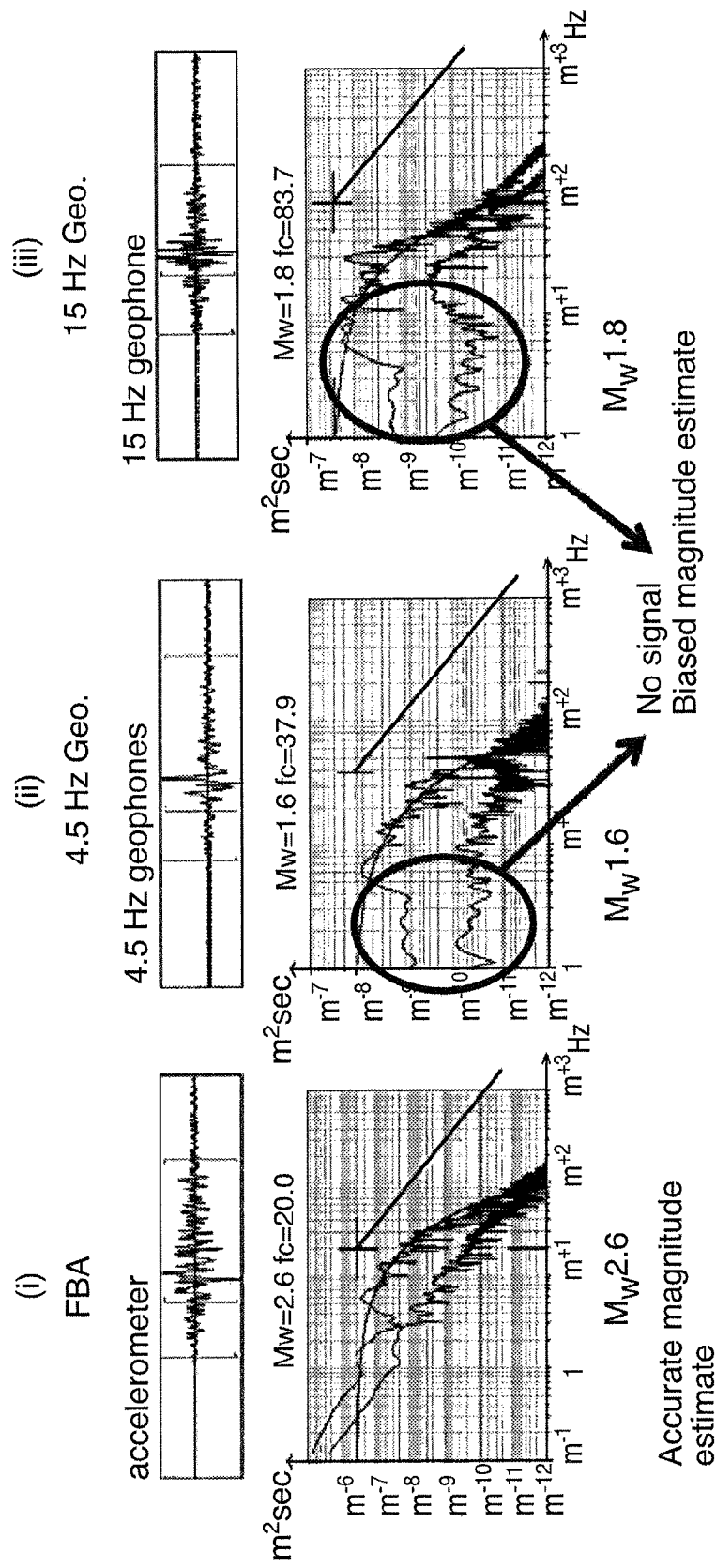
FIG. 15 illustrates spectral modelling of SH waves recorded at three different sensors: (left) accelerometer FBA sensor; (middle) 4.5 Hz geophone sensor and; (right) 15 Hz geophone sensor.

To facilitate an understanding of how different sensor types measure a seismic event in an example system 100, FIG. 15 shows an example fit of a Brune spectrum to the signals recorded from (i) FBA sensors 102, (ii) 4.5 Hz geophone sensors 103 and (iii) 15 Hz geophone sensors 104 for a larger microseismic event with Mw=2.3. This example features the spectra of the P waves as seen on all three sensor types all associated with the same observation well, with the 4.5 Hz and 15 Hz geophone sensors 103, 104 deployed downhole and the FBA sensor 102 on the surface, proximal to the well. An attenuation factor is applied to all of the spectra based on a model of the seismic attenuation for both P and S waves, but the influence of this model is to attenuate the high frequencies preferentially and does not affect necessarily the estimates of the long-period plateau in this example. FIG. 15 illustrates how the short-period sensors (the geophone sensors) underestimate the moment magnitudes of the large event—while the FBA sensor 102 accurately recovers the magnitude of Mw1.8, the other geophone sensors 103, 104 show saturation around Mw=1.6 and Mw=1.8, respectively. This depletion of low frequencies in the geophone records (ii) and (iii) can also be observed by the breakdown of the noise signal around the natural period of the sensor instruments which is not observed at the FBA record (i).

Figure 16:
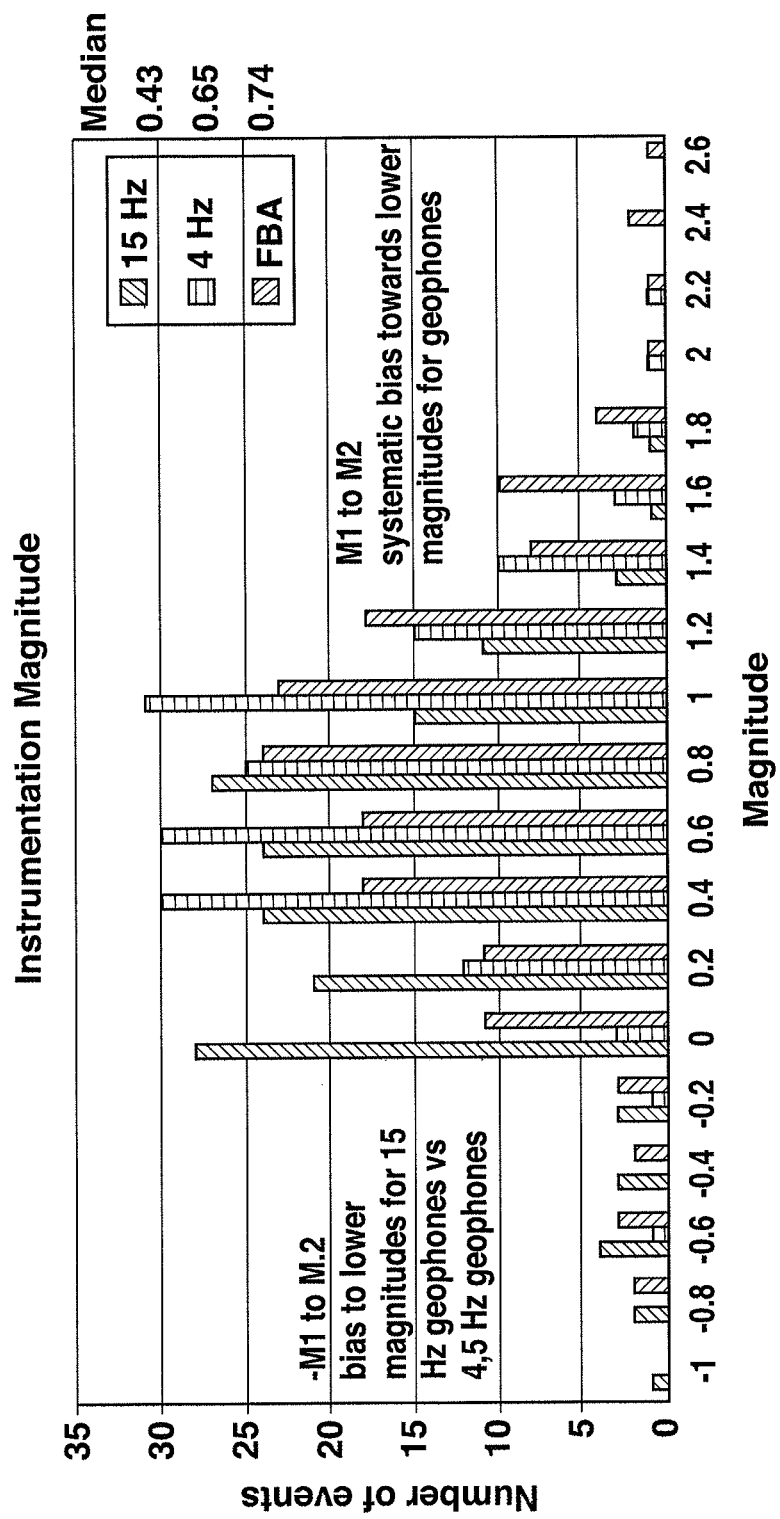
FIG. 16 illustrates an example comparison of the magnitudes of several seismic events as calculated from data from each sensor type including FBA sensors 102, 4.5 Hz geophone sensors 103 and 15 Hz geophone sensors 104.

FIG. 16 illustrates an example comparison of the magnitudes of several seismic events as calculated from data from each sensor type including FBA sensors 102, 4.5 Hz geophone sensors 103 and 15 Hz geophone sensors 104. As can be seen from FIG. 16, there is a definite systematic bias toward lower magnitudes for the large events in the dataset (Mw1-Mw2) when only the shorter-period geophone sensors are used in the calculation. There is a similar bias towards lower magnitudes when comparing the magnitudes determined from the 15 Hz geophone sensors versus the 4.5 Hz geophone sensors. The median values of the independent magnitude datasets capture the effect of these biases: 0.74 for the FBA sensors; 0.65 for the 4.5 Hz geophone sensors; and 0.43 Hz for the 15 Hz geophone sensors. This comparison of datasets highlights how accurately capturing the long-period spectrum can mitigate against underestimating the magnitudes.

Figure 17:
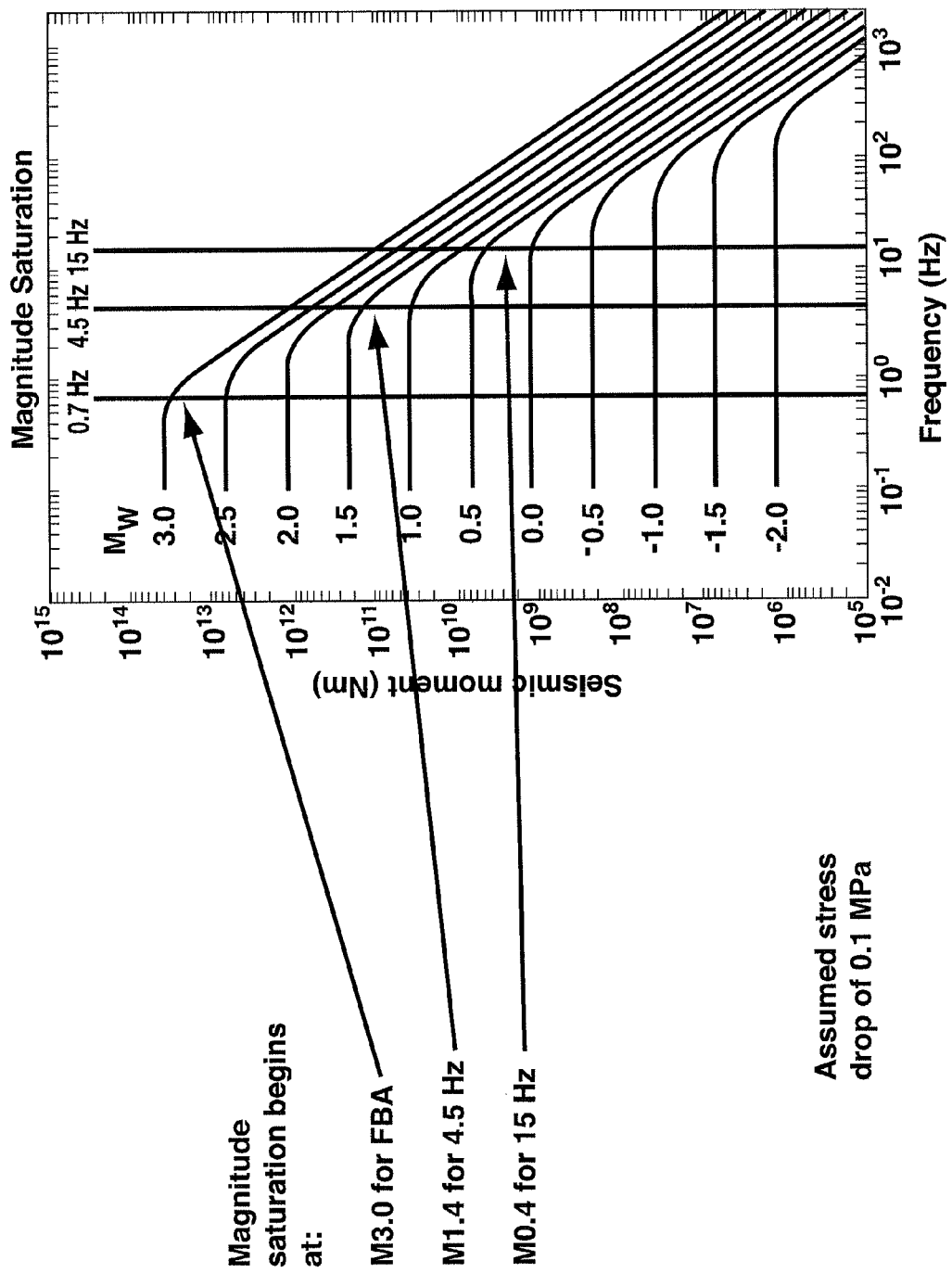
FIG. 17 illustrates a magnitude scale saturation for short-period sensors (15 hz and 4.5 Hz geophone sensors) as well as for FBA sensors for synthetic events.

The effects observed in FIG. 16 are known as magnitude saturation—in at least some applications, the natural frequency of the recording sensors that causes the calculated magnitudes to saturate. To illustrate this effect, FIG. 17 illustrates a magnitude scale saturation for short-period sensors (15 hz and 4.5 Hz geophone sensors 104, 103) as well as for FBS sensors 102 for synthetic events. Synthetic source spectra are computed from −Mw2 to Mw3 events in increments of half magnitude units, with an assumed constant stress drop of 0.1 MPa used in the calculations, and the median stress drop of the events estimated from the FBA sensor data. For events with the same seismic moment, a higher stress drop event will have a higher corner frequency and vice-versa. The representation of the synthetic spectra computed with a higher stress drop in FIG. 17 would be equivalent in displacing the spectra to the right along the x axis and to the left for a lower stress drop. Saturation of the magnitude scale occurs when the long-period spectral plateaus fall completely outside the recording bandwidth. Accordingly, when the event corner frequency is below the natural frequency of the sensor instrument, then magnitude saturation occurs and the source parameters determined from such instruments will be inaccurate. In one example configuration, the magnitudes start to saturate at around Mw 0.4 for the 15 Hz geophone, around Mw1.4 for the 4.5 Hz geophone sensors, and at about Mw3 for the FBA sensors (considering the FBA sensors in the described example are calibrated with a cut-off frequency of 0.7 Hz). The scale will be fully saturated at higher magnitudes. In practice, recording and analysis of data would occur below these saturation limits.

For these largest events, the FBA data returns accurate source parameters showing how longer-period sensors are necessary to adequately characterize larger-magnitude, induced events. Accordingly, in at least some applications the system 100 which utilizes a hybrid system of vertical borehole arrays of geophone sensors 103, 104 and FBA surface sensors 102 may facilitate more accurate magnitude estimates across a range of seismic event sizes, including larger events. The inclusion of longer period sensors such as FBA sensors may assist in avoiding the scale saturation effects that bias magnitude estimates to lower values for shorter period sensors such as geophones, thereby allowing the system 100 to avoid underestimating larger seismic events.

In some example embodiments, different weighting can be applied to the data streams received from different sensor types in dependence on the measured results. For example, if the magnitude for a seismic event is determined to be above a predetermined threshold that is associated with magnitude saturation for the higher frequency geophone sensors 103, 104, the data from such sensors may be ignored for the particular seismic event in favour of the data from FBA sensors 102. Conversely, for smaller magnitude events, the data from FBA sensors 102 may be given little or no weight relative to data from geophone sensors 103, 104, particularly since it would be unlikely that a coherent signal will be observed on the surface.

In some example embodiments, data streams from different sensor types may be combined to optimize the resulting information—for example, for a higher magnitude event, data from the higher frequency geophone sensors 103, 104 may be used to calculate a location for the event, and this location information combined with signals from the FBA sensors 102 to determine a magnitude for the event. By modeling the spectra for all of the observable signals on the different types of sensor instruments, the corner frequency for the waveforms on each sensor 102, 103, 104 can be determined. If the corner frequency determination for a lower frequency sensor is sufficiently near or below the low frequency corner of the bandwidth of the higher frequency sensor, then the higher frequency sensor will be saturated and the resulting source parameter calculations from that instrument will be biased. Only the lower frequency sensor instrumentation will return accurate source parameters in this case, and as such the magnitudes, radiated energies, corner frequencies, stress drops and other such source parameters will be calculated using only the data streams acquired from the lower frequency sensors.

In some example systems, the sensors may include just two types of sensors—for example FBA sensors and 15 Hz geophone sensors. In some examples, the system may include more than three types or classes of sensors. Furthermore, the frequency response ranges for the sensors could be different than that stated above. By way of non-limiting example, surface or near-surface sensors 102 could have a low frequency cutoff of anywhere from 0 Hz to 3 Hz, subsurface geophone sensors 103 could have a low frequency cutoff of anywhere from 1 Hz to 15 Hz and; geophone sensors 104 could have a low frequency cutoff of anywhere from 10 Hz to 30 Hz.

All numeric examples and numeric ranges specified herein in respect of numbers and location of sensors and sensor frequencies and periods are illustrative examples—other numeric values and numeric ranges may be used as appropriate. While embodiments of the present invention have been shown and described herein, it will be obvious that each such embodiment is provided by way of example only. Numerous variations, changes, and substitutions will occur to those skilled in the art without departing from the invention disclosed.

What is claimed is:

1. A system for monitoring seismicity during fluid injection at or near a hydrocarbon reservoir comprising:
    a first set of seismic sensors for deployment at a site for collecting seismic data;
    a second set of seismic sensors for sub-surface deployment at the site at a depth lower than the first set of sensors for collecting seismic data, the first set of sensors having a lower frequency response and being less sensitive to magnitude saturation than that of the second set of sensors; and
    a data collection system in communication with the first and second set of seismic sensors, the data collection system being configured to determine if seismic data from the first set of seismic sensors for a seismic event is indicative of a biasing of seismic data from the second set of sensors and if so, then using the seismic data from the first set of seismic sensors exclusive of the seismic data from the second set of seismic sensors to determine a seismic event magnitude for the seismic event, and if not then using the seismic data from at least the second set of seismic sensors to determine a seismic event magnitude for the seismic event.

2. The system of claim 1 wherein the first set of seismic sensors have a low frequency cutoff of between 0 Hz and 2 Hz and the second set of seismic sensors have a low frequency cutoff of between 10 and 30 Hz.

3. The system of claim 2 wherein the first set of seismic sensors comprise force balanced sensors and the second set of seismic sensors comprise geophones.

4. The system of claim 3 wherein the first set of seismic sensors comprise force balanced accelerometers.

5. The system of claim 1 wherein the first set of seismic sensors are deployed at or near a surface of the site above the reservoir and the second set of seismic sensors are deployed at or near a depth of an excitation zone used to induce seismic events in the reservoir.

6. The system of claim 1 comprising at least a third set of seismic sensors for sub-surface deployment at the site at a depth between the first set of seismic sensors and the second set of seismic sensors for collecting seismic data, the third set of seismic sensors communicating with the data collection system and having a frequency response between the frequency response of the first set of seismic sensors and the second set of seismic sensors.

7. The system of claim 6 wherein the first set of seismic sensors comprise force balanced accelerometers, the third set of seismic sensors comprise omni-directional three component geophones having a low frequency response cutoff of between 3 and 8 Hz, and the second set of seismic sensors comprise omni-directional three component geophones having a low frequency response cutoff of between 8 and 30 Hz.

8. The system of claim 7 wherein the second and third set of seismic sensors are deployed down boreholes in the reservoir, with the second set of seismic sensors deployed at or near a depth of an excitation zone used to induce seismic events in the reservoir.

9. The system of claim 7 wherein the data collection system imposes a low frequency limit of between 0.1 and 0.9 Hz on the force balanced accelerometers.

10. The system of claim 9 wherein the data collection system samples data from the geophones at a higher sampling rate than the force balanced accelerometers.

11. The system of claim 1 wherein the data collection system imposes, for each recorded seismic event, a longer response time window for data collected from sensors of first set of seismic sensors than for data collected from the second set of seismic sensors.

12. The system of claim 1 wherein the data collection system is configured to determine if seismic data from the first set of seismic sensors for the seismic event is indicative of the biasing of seismic data from the second set of sensors by determining if a corner frequency of the seismic data from the first set of seismic sensors is within a threshold of a low frequency corner of the second set of seismic sensors.

13. The system of claim 1 wherein the data collection system is configured to, when determining seismic magnitude using the seismic data from the first set of seismic sensors, determine location information for the seismic event in dependence on the seismic data from the second set of seismic sensors.

14. A method for monitoring seismic events induced at or near a hydrocarbon reservoir, comprising:
- deploying a first set of seismic sensors at a site for collecting seismic data;
- deploying a second set of seismic sensors at the site at a depth lower than the first set of seismic sensors for collecting seismic data, the first set of seismic sensors having a lower frequency response and being less sensitive to magnitude saturation than that of the second set of seismic sensors;
- collecting seismic data generated by the first set and second sets of seismic sensors; and
- determining if seismic data from the first set of seismic sensors for a seismic event is indicative of a biasing of seismic data from the second set of sensors and if so, then using the seismic data from the first set of seismic sensors exclusive of the seismic data from the second set of seismic sensors to determine a seismic event magnitude for the seismic event, and if not then using the seismic data from at least the second set of seismic sensors to determine a seismic event magnitude for the seismic event.

15. The method of claim 14 wherein the first set of seismic sensors have a low frequency cutoff of between 0 Hz and 2 Hz and the second set of seismic sensors have a low frequency cutoff of between 10 and 30 Hz.

16. The method of claim 15 wherein the first set of seismic sensors comprise force balanced accelerometers and the second set of seismic sensors comprise geophones.

17. The method of claim 14 wherein the first set of seismic sensors are deployed at or near a surface of the site above the reservoir and the second set of seismic sensors are deployed at or near a depth of an excitation zone used to induce seismic events in the reservoir.

18. The method of claim 14 comprising deploying a third set of seismic sensors at the site at a depth between the first set of seismic sensors and the second set of seismic sensors, the third set of seismic sensors having a frequency response between the frequency response of the first set of seismic sensors and the second set of seismic sensors, and collecting seismic data comprises collecting seismic data generated by the third sets of seismic sensors.

19. The method of claim 18 wherein the first set of seismic sensors comprise force balanced accelerometers, the third set of seismic sensors comprise omni-directional three component geophones having a low frequency response cutoff of between 3 and 8 Hz, and the second set of seismic sensors comprise omni-directional three component geophones having a low frequency response cutoff of between 8 and 30 Hz.

20. The method of claim 19 wherein the second and third set of seismic sensors are deployed down boreholes in the reservoir, with the second set of seismic sensors deployed at or near a depth of an excitation zone used to induce seismic events in the reservoir.

21. The method of claim 14 wherein determining if seismic data from the first set of seismic sensors for the seismic event is indicative of the biasing of seismic data from the second set of sensors comprises determining if a corner frequency of the seismic data from the first set of seismic sensors is within a threshold a low frequency corner of the second set of seismic sensors.

22. A method for monitoring seismic events induced at or near a hydrocarbon reservoir, comprising:
- deploying a first set of seismic sensors at a site for collecting seismic data;
- deploying a second set of seismic sensors at the site for collecting seismic data, the first set of seismic sensors having a lower frequency response than that of the second set of seismic sensors;
- collecting seismic data generated by the first set and second sets of seismic sensors; and
- determining, with a computer, if the seismic data from the first set of seismic sensors for a seismic event has a frequency corner that is below a predetermined threshold, and if so then using the seismic data from the first set of seismic sensors exclusive of the seismic data from the second set of seismic sensors to determine a seismic event magnitude for the seismic event, and if not then using the seismic data from at least the second set of seismic sensors to determine a seismic event magnitude for the seismic event.

* * * * *